United States Patent
Paulus et al.

(10) Patent No.: US 10,169,827 B1
(45) Date of Patent: Jan. 1, 2019

(54) METHOD AND SYSTEM FOR ADAPTING A USER EXPERIENCE PROVIDED THROUGH AN INTERACTIVE SOFTWARE SYSTEM TO THE CONTENT BEING DELIVERED AND THE PREDICTED EMOTIONAL IMPACT ON THE USER OF THAT CONTENT

(71) Applicant: Intuit Inc., Mountain View, CA (US)

(72) Inventors: Wolfgang Paulus, Ramona, CA (US); Luis Felipe Cabrera, Bellevue, WA (US); Mike Graves, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 768 days.

(21) Appl. No.: 14/671,138

(22) Filed: Mar. 27, 2015

(51) Int. Cl.
*G06Q 40/00* (2012.01)
*G06Q 40/02* (2012.01)

(52) U.S. Cl.
CPC .......... *G06Q 40/123* (2013.12); *G06Q 40/02* (2013.01)

(58) Field of Classification Search
CPC ............................ G06Q 40/123; G06Q 40/02
See application file for complete search history.

(56) References Cited

U.S. PATENT DOCUMENTS

| | | | |
|---|---|---|---|
| 7,412,708 B1 | 8/2008 | Khan et al. | |
| 8,683,348 B1 | 3/2014 | Blank et al. | |
| 8,799,157 B1 | 8/2014 | Weisman et al. | |
| 8,806,444 B1 | 8/2014 | Podgorny et al. | |
| 8,903,176 B2 | 12/2014 | Hill | |
| 9,098,109 B2 | 8/2015 | Lappalainen et al. | |
| 9,330,239 B2 | 5/2016 | Koduri et al. | |
| 9,444,824 B1 | 9/2016 | Balazs et al. | |
| 9,785,534 B1 | 10/2017 | Paulus et al. | |
| 9,930,102 B1 | 3/2018 | Paulus et al. | |
| 2002/0199166 A1 | 12/2002 | Volcani et al. | |
| 2004/0066932 A1 | 4/2004 | Seligmann | |
| 2004/0147814 A1* | 7/2004 | Zancho ................. | H04M 19/04 600/300 |
| 2005/0091487 A1 | 4/2005 | Cross et al. | |
| 2006/0150243 A1 | 7/2006 | French et al. | |

(Continued)

FOREIGN PATENT DOCUMENTS

| | | | | | |
|---|---|---|---|---|---|
| WO | WO-2007145900 A2 | * | 12/2007 | ............. | G06Q 10/06 |
| WO | WO-2010119379 A1 | * | 10/2010 | ....... | G06F 17/30867 |

*Primary Examiner* — Eric T Wong
(74) *Attorney, Agent, or Firm* — Hawley Troxell Ennis & Hawley LLP; Philip McKay

(57) ABSTRACT

Current content data, user historical context data, and user feedback and emotional profile data is analyzed to predict emotional effect on the user of content to be provided to the user through an interactive software system. The resulting emotional effect data is then used to dynamically modify the form of the content delivery message and/or the user's experience by selecting one or more content delivery messages and/or user experience components based on the emotional effect data before, or as, the content is delivered to the user. In this way, different types of content delivery messages and/or user experience components can be utilized, and/or combined, to provide the user with an individualized user experience that is adapted to the predicted emotional effect on the user of the content being delivered, before, or as, that content is being delivered.

17 Claims, 3 Drawing Sheets

(56) References Cited

U.S. PATENT DOCUMENTS

| | | | |
|---|---|---|---|
| 2006/0190822 A1* | 8/2006 | Basson | G06Q 10/10 715/700 |
| 2006/0218506 A1 | 9/2006 | Srenger et al. | |
| 2008/0276186 A1 | 11/2008 | Feduszczak et al. | |
| 2009/0002178 A1 | 1/2009 | Guday et al. | |
| 2009/0172100 A1 | 7/2009 | Callanan et al. | |
| 2010/0083320 A1* | 4/2010 | Roberts | H04N 7/17318 725/61 |
| 2010/0107075 A1* | 4/2010 | Hawthorne | G06Q 10/06 715/708 |
| 2011/0131274 A1 | 6/2011 | Hille | |
| 2012/0011477 A1 | 1/2012 | Sivadas | |
| 2012/0059785 A1 | 3/2012 | Pascual et al. | |
| 2012/0124456 A1* | 5/2012 | Perez | G06Q 30/02 715/200 |
| 2012/0130819 A1* | 5/2012 | Willcock | G06F 17/30867 705/14.66 |
| 2012/0270575 A1 | 10/2012 | Ferren et al. | |
| 2012/0306643 A1 | 12/2012 | Dugan | |
| 2013/0124496 A1 | 5/2013 | Edgar et al. | |
| 2013/0152000 A1 | 6/2013 | Liu et al. | |
| 2013/0159228 A1* | 6/2013 | Meijer | G06F 9/4443 706/14 |
| 2013/0232207 A1 | 9/2013 | Westphal | |
| 2013/0325948 A1 | 12/2013 | Chen et al. | |
| 2014/0089399 A1 | 3/2014 | Chun et al. | |
| 2014/0168279 A1 | 6/2014 | Huang | |
| 2014/0222849 A1* | 8/2014 | Stivoric | G06Q 30/0242 707/758 |
| 2014/0289034 A1 | 9/2014 | Wu | |
| 2014/0324749 A1* | 10/2014 | Peters | G09B 7/04 706/46 |
| 2014/0325379 A1 | 10/2014 | McDevitt et al. | |
| 2015/0040026 A1 | 2/2015 | Sergunin | |
| 2015/0046436 A1 | 2/2015 | Li et al. | |
| 2015/0371516 A1 | 12/2015 | Petersen et al. | |
| 2016/0000385 A1 | 1/2016 | Petersen et al. | |
| 2016/0048274 A1 | 2/2016 | Rosenberg | |
| 2016/0063874 A1* | 3/2016 | Czerwinski | G09B 5/06 434/236 |
| 2016/0066829 A1 | 3/2016 | Sales et al. | |
| 2017/0243055 A1* | 8/2017 | Naveh | G06K 9/00302 |
| 2017/0316707 A1* | 11/2017 | Lawrenson | G06F 9/4446 |

* cited by examiner

METHOD AND SYSTEM FOR ADAPTING A USER EXPERIENCE PROVIDED THROUGH AN INTERACTIVE SOFTWARE SYSTEM TO THE CONTENT BEING DELIVERED AND THE PREDICTED EMOTIONAL IMPACT ON THE USER OF THAT CONTENT

BACKGROUND

Interactive software systems are diverse and valuable tools, providing services that were either never before available, or were previously available only through interaction with a human professional. For example, an interactive software system may provide tax preparation or financial management services. Prior to the advent of interactive software systems, a user would be required to consult with a tax preparation or financial management professional for services and the user would be limited, and potentially inconvenienced, by the hours during which the professional was available for consultation. Furthermore, the user might be required to travel to the professional's physical location. Beyond the inconveniences of scheduling and travel, the user would also be at the mercy of the professional's education, skill, personality, and varying moods. All of these factors resulted in a user vulnerable to human error and variations in human ability and temperament.

Some interactive software systems provide services that human professionals are not capable of providing, and even those interactive software systems providing services similar to those historically provided by human professionals offer many benefits: the interactive software system does not have limited working hours, is not geographically limited, and is not subject to human error or variations in human ability or temperament.

Although interactive software systems represent a potentially highly flexible, readily accessible, and affordable source for a multitude of services, currently available interactive software systems do have several significant shortcomings. For example, unlike human professionals providing services and human interaction, traditional interactive software systems cannot, or do not, adjust, must less dynamically adapt, interactions with a user based on the content being delivered, and/or the individual user's historical data related to the current content being delivered, and/or variations in the emotional state of the user, and/or the individual user's sensitivities and the potential emotional effect of the information being provided to the individual user, and/or the culture/customs associated with the individual user.

The problem arises largely because currently available interactive software systems are developed in a way that specifically attempts to address the needs of as broad a spectrum of users and content as possible, i.e., the content and user experience is provided in a static "one size fits all" approach. Indeed, traditional interactive software systems are, by design, fairly generic in nature and often lack the malleability to meet the specific needs of a given user, much less adapt to the content being delivered, and/or the individual user's historical data related to the current content being delivered, and/or variations in the emotional state of the user, and/or the individual user's sensitivities and the potential emotional effect of the information being provided to the individual user, and/or the culture/customs associated with the individual user. As a result, an interactive software system designed for a generic content and hypothetical user may alienate, or even insult, a specific user, who has a temperament, particular circumstances, and/or cultural background, that differs even slightly from the assumed temperament, circumstances, and/or culture of the generic, hypothetical user used as a model for generating currently available static user experiences.

For example, traditional interactive software systems often present a static, predetermined, and pre-packaged content delivery messages and user experience components to all users for all content. These content delivery messages and user experience components are typically presented to every user for every type of content with little or no customization; are typically generated in a static and generic manner; and are typically provided via a combination of content delivery messages and user experience components, which include, but are not limited to, message wording and tone, audio data, interface displays, images, background music, and assistance resources. Using traditional interactive software systems static, or very limited, content delivery messages and sets of user experience components are typically hard-coded elements of the interactive software system and do not lend themselves to effective or efficient modification, or even re-combination. As a result, traditional interactive software systems do not adapt or adjust the user experience provided to a user based on the content being delivered, and/or the individual user's historical data related to the current content being delivered, and/or variations in the emotional state of the user, and/or the individual user's sensitivities and the potential emotional effect of the information being provided to the individual user, and/or the culture/customs associated with the individual user, to ensure the interaction with the user is appropriate to the content being delivered, and is respectful, in light of the individual user's circumstances, sensitivities, and the potential emotional effect of the content being provided.

As a specific illustrative example, typical currently available interactive software systems offering navigation and/or mapping services might default to using a happy or neutral human voice for making recommendations and reports. However, if the interactive software system is reporting an accident with fatalities it is appropriate/respectful for the voice delivering this information to be somber, and certainly not upbeat or giggly.

As another specific illustrative example, using a typical currently available interactive software system offering tax return preparation service, any calculated tax refund is assumed to be a positive event for the user. Consequently, anytime a refund is calculated, the interactive software system might be programmed to display the content delivery message "You have a refund!!!" in a congratulatory display, font, pop-up, avatar, and/or voice. However, assume for the moment, the user is indeed due for a tax refund but the currently calculated refund is significantly less than the user's historical refund amount. In this specific example, it is doubtful the user will be thrilled to discover this fact and will likely not appreciate the upbeat and congratulatory "You have a refund!!!" content delivery message statically programmed into the interactive software system. In this case, the static content delivery message and/or user experience components are actually inappropriate for this user, and might even be insulting, or provide a convenient focus for the user's anger/disappointment; i.e., the user might well be tempted to blame the insensitive messenger.

As discussed above, the inability of traditional interactive software systems to dynamically adapt the content delivery message and user experience components to the content being delivered, and/or variations in the emotional state of the user, and/or the individual user's sensitivities and the potential emotional effect of the information being provided to the individual user, and/or the culture/customs associated with the individual user often results in user alienation, frustration, and even insult. Clearly, this is not the type of impression that results in happy, loyal, repeat customers and, in turn, can ultimately result in lost customers. This is because, predictably, when users are alienated from, become frustrated with, or are insulted by, an interactive software system, they are far more likely to abandon the interactive software system, which results in lost business.

Even worse, when the inability of traditional interactive software systems to dynamically adapt the user experience to the content being delivered, and/or variations in the emotional state of the user, and/or the individual user's sensitivities and the potential emotional effect of the information being provided to the individual user, and/or the culture/customs associated with the individual user causes users to become frustrated with their user experience, the software system, and/or the provider of the software system, these users may spread the word of their dissatisfaction to other potential users. Today, more than ever, this is a serious situation given the speed and reach of modern communications and the fact that any complaints voiced by a dissatisfied user may reach a myriad of other potential users. Indeed, the number of people that can become the audience for a single complaint is overwhelming and the potential reach of a single complaint can create serious consequences. Clearly, this is again an undesirable result for both the potential user of the interactive software system and the provider of the interactive software system.

Given the consequences of dissatisfied customers, it is in the best interest of the provider of an interactive software system to provide a dynamic and customized user experience to its users. What is needed is a method and system for dynamically adapting the content delivery message and user experience components to the content being delivered, and/ or variations in the emotional state of the user, and/or the individual user's sensitivities and the potential emotional effect of the information being provided to the individual user, and/or the culture/customs associated with the individual user.

SUMMARY

Embodiments of the present disclosure address some of the long-standing shortcomings associated with traditional interactive software systems by obtaining access to current content data representing the current content to be provided to a user. User historical context data representing the individual user's historical data and experiences related to the current content being delivered is also accessed along with user feedback and emotional profile data representing the feedback and/or historical emotional data from the user indicating the sensitivities of the individual user and/or the user's culture/society.

In one embodiment, the current content data, the user historical context data, and user feedback and emotional profile data is then analyzed to predict an emotional effect on the user of the current content to be provided to the user before that content is provided to the user. In one embodiment, emotional effect data is then generated indicating the predicted emotional effect on the user of the current content to be provided to the user and the emotional effect data is correlated to the current content data.

In one embodiment, the resulting emotional effect data is used to dynamically modify the content delivery message, e.g., wording, and/or user experience components by selecting one or more content delivery messages and/or user experience components based on the emotional effect data before the current content is delivered to the user. In this way, content appropriate types of content delivery messages and/or user experience components can be utilized, and/or combined, by a single interactive software system, or multiple interactive software systems, to provide the user with an individualized content delivery message and/or user experience components that are adapted to the content being delivered, and/or variations in the emotional state of the user, and/or the individual user's sensitivities and the potential emotional effect of the information being provided to the individual user, and/or the culture/customs associated with the individual user before, or as, that content is delivered.

In addition, in various embodiments, the user feedback and emotional profile data includes emotional state data associated with a user. In some embodiments, the emotional state data associated with a user is monitored and used to detect that the user is in, or is entering, an undesirable emotional state. For example, in one embodiment, emotional state data is used to detect whether the user is becoming frustrated or stressed. Then, in one embodiment, different types of content delivery messages and/or user experience components can be utilized, and/or re-combined, to adjust the user experience to adapt to the user's new emotional state, and the predicted emotional effect on the user of the content being delivered, as that content is being delivered. This adaptation of the content delivery message and user experience components is performed to prevent the user from entering an undesirable emotional state, and/or encourage the user to enter into a desirable emotional state. In this way, the disclosed embodiments can be used to prevent the user from becoming frustrated with the interactive software system and potentially abandoning the interactive software system based on relative real-time data about the effect of the content delivery message and user experience components on the user.

The various embodiments of the disclosure, and their associated benefits, as discussed herein, improve the technical field of interactive software systems and data processing by using current content data, user historical context data, and user feedback and emotional profile data to predict an emotional effect on the user of content to be provided to the user before that content is provided to the user. In this way, the content delivery message and user experience components provided can be individualized to the user in an evolving, dynamic, manner that is not only customized to an individual user, but also to the content being delivered, and/or variations in the emotional state of the user, and/or the individual user's sensitivities and the potential emotional effect of the information being provided to the individual user, and/or the culture/customs associated with the individual user. Consequently, the disclosed embodiments amount to significantly more than an implementation of the abstract idea of customizing a message or user experience to a specific user.

Figure 1:
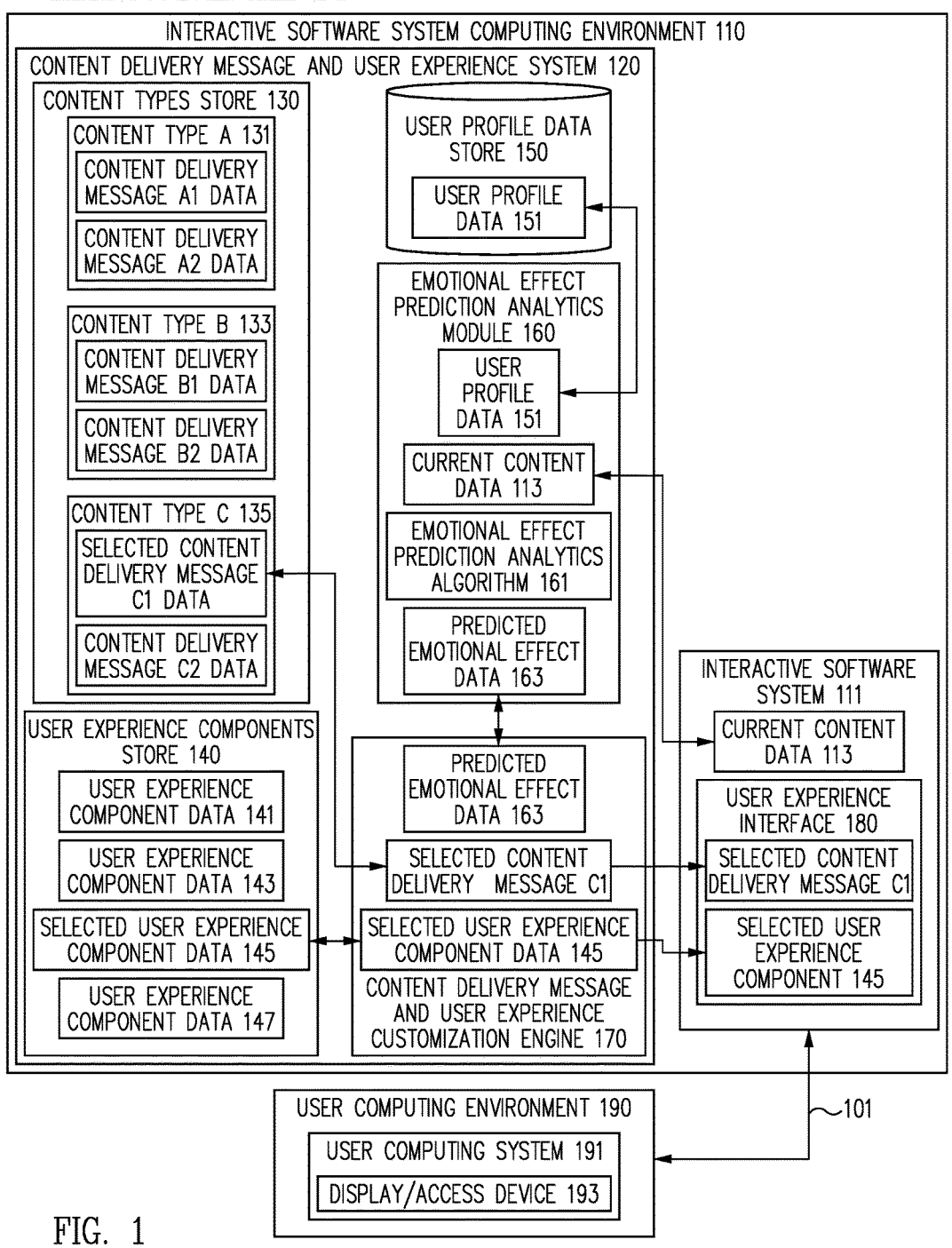
FIG. 1 is a block diagram of an architecture for adapting a user experience provided through an interactive software system to the content being delivered and the predicted emotional impact on the user of that content, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Instead, these exemplary embodiments are provided to allow a complete disclosure that conveys the principles of the invention, as set forth in the claims, to those of skill in the art.

Definitions

Herein, the term "interactive software system" can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data from one or more sources, provides data to one or more sources, and/or has the capability to analyze at least part of the data.

The term "interactive software system" includes, but is not limited to, any software system that provides an interactive user experience to its users and is implemented on a computing system, accessed through one or more servers, accessed through a network, accessed through a cloud, and/or provided through any computing system or by any means as discussed herein, as known in the art at the time of filing, and/or as developed after the time of filing.

As used herein, the term "interactive software system" includes, but is not limited to, the following: web-based, online, and/or computing system implemented personal and/or business tax preparation systems, services, packages, programs, modules, or applications; web-based, online, and/or computing system implemented personal and/or business financial management systems, services, packages, programs, modules, or applications; web-based, online, and/or computing system implemented personal and/or business management systems, services, packages, programs, modules, or applications; web-based, online, and/or computing system implemented personal and/or business accounting and/or invoicing systems, services, packages, programs, modules, or applications; and various other personal and/or business electronic data management systems, services, packages, programs, modules, or applications, whether known at the time of filing or as developed later.

Specific examples of interactive software systems include, but are not limited to the following: TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system," "computing device," and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; or any other movable/mobile device and/or computing system that includes components that can execute all, or part, of any one of the processes and/or operations as described herein.

Herein, the terms "mobile computing system" and "mobile device" specifically include devices worn or carried by a user such as, but not limited to, smart watches, wearable Personal Digital Assistants (PDAs); wearable media players; wearable Internet appliances; wearable phones; and/or any other computing system that can be worn by a user and that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein the term "content" refers to the wording of the subject matter/information that is provided via data, messages, and/or any other form of conveying information as discussed herein, and/or as known in the art at the time of filing, and/or as developed after the time of filing.

Herein the term "content type" includes, but is not limited to, the subject matter or type of content, e.g., the subject matter of the information, that is provided via data, messages, and/or any other form of conveying information as discussed herein, and/or as known in the art at the time of filing, and/or as developed after the time of filing.

Herein the term "content delivery message" refers to entire message delivered including specific wording of text, audio, video, visual, or any other data and formats/forms of data used to convey information, and/or the mechanisms used to relay the specific wording or the text, audio, video, visual, or any other data and formats/forms of data used to convey information as discussed herein, and/or as known in the art at the time of filing, and/or as developed after the time of filing. Specific examples of content delivery messages include the wording of text, audio, video, visual, or any other data arrangement/format used to convey information and the e-mails, video, audio, icons, pop-up displays etc. used to convey the information. As an even more specific example, content delivery messages include not only the specific wording of the content delivery message, but also the tone and/or way the content is delivered, e.g., as good news, bad news, happy/upbeat, unhappy/down beat, etc. For any given content, multiple versions of content delivery messages, each with different wording and a different tone, nuance, presentation format, and/or vehicle/medium are possible which convey the content in a different tone.

Herein, the term "user profile data" includes but is not limited to: user historical context data representing the individual user's historical data and experiences related to content being delivered; peer group historical context data representing historical data and experiences of peers of the user and/or other users similar the user related to content being delivered; and/or user feedback and emotional profile data representing the feedback and/or historical data from the user indicating the sensitivities of the individual user and/or the user's culture/society; and/or emotional state data indicating an emotional state of a user.

Herein, the term "user historical context data" includes, but is not limited to, historical financial data, historical use data, historical feedback data, historical profile data, historical emotional state data, historical demographic data, historical employment data, and/or any other historical data associated with a user, and/or peers or similarly situated other users, that is related to current content to be delivered to a user as discussed herein, and/or as known in the art at the time of filing, and/or as developed after the time of filing. As a specific example, for content indicating a tax refund and amount, the user historical context data could include data indicating the user's historical refund amounts.

Herein, the term "user feedback and emotional profile data" includes, but is not limited to, any data received from the user representing the feedback and/or relevant data about the user indicating the sensitivities of the individual user and/or the user's culture/society as discussed herein, and/or as known in the art at the time of filing, and/or as developed after the time of filing. As a specific example, in various embodiments, user feedback and emotional profile data can include, but is not limited to: data received from the user regarding the appropriateness of previously provided content delivery messages and/or user experience components; data indicating the user's marital status, and/or changes in the user's marital status; the number of user dependents, and/or changes in the number of user dependents; the user's employment/employment status; and/or changes in the user's employment/employment status; the heritage/culture, and/or geographic background, of the user; data indicating accepted norms and respectful interaction protocols associated with the heritage/culture, and/or geographic background, of the user; the current geographic location of the user, and/or changes in the geographic location of the user; data indicating accepted norms and respectful interaction protocol associated with the current geographic location of the user; and/or any other data indicating the sensitivities of the individual user and/or the user's culture/society as discussed herein, and/or as known in the art at the time of filing, and/or as developed after the time of filing.

Herein, the term "emotional state" refers to an emotional state of a user and includes, but is not limited to, a happy emotional state or happiness; a sad emotional state or sadness; a surprised emotional state or surprise; a fearful emotional state or fear; a disgusted emotional state or disgust; an angry emotional state or anger; a tense emotional state; a nervous emotional state; a stressed emotional state; an upset emotional state; a frustrated emotional state; a depressed emotional state; a bored emotional state; a fatigued emotional state; an alert emotional state; an excited emotional state; an elated emotional state; a contented emotional state; a serene emotional state; a relaxed emotional state; and/or a calm emotional state.

As used herein, the term "emotional state data" refers to a quantitative representation of a predicted emotional state and/or combination of emotional states and/or physiological, behavioral, and/or experiential indications of an emotional state and/or a combination of emotional states.

As used herein, the term "emotional state threshold parameter" refers to specific values and/or ranges of values associated with a particular emotional state or combination of emotional states.

Herein, the term "user experience" includes the practical, experiential, affective, significant, and/or valuable aspects of human-software interaction including, but not limited to, data entry, question submission, and/or interview process. As used herein, the term "user experience" includes both the content delivery messages provided to the user and the user experience components, and/or combinations of user experience components, provided or displayed to the user such as, but not limited to, the following: individualized user interview questions and question sequences, user interfaces, interface displays, sub-displays, images, side bar displays, pop-up displays, alarms, music, backgrounds, avatars, highlighting mechanisms, icons, assistance resources, user recommendations, supplemental actions and recommendations, voice tones and frequencies, inflections, etc., and/or any other components that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for adapting a user experience provided through an interactive software system to the content being delivered and the predicted emotional impact on the user of that content described herein, and/or a person and/or entity that interfaces with, and/or to whom information is provided by, the method and system for adapting a user experience provided through an interactive software system to the content being delivered and the predicted emotional impact on the user of that content described herein, and/or a legal guardian of person and/or entity that interfaces with, and/or to whom information is provided by, the method and system for adapting a user experience provided through an interactive software system to the content being delivered and the predicted emotional impact on the user of that content described herein, and/or an authorized agent of any party and/or person and/or entity that interfaces with, and/or to whom information is provided by, the method and system for adapting a user experience provided through an interactive software system to the content being delivered and the predicted emotional impact on the user of that content described herein. For instance, in various embodiments, a user can be, but is not limited to, a person, a commercial entity, an application, a service, and/or a computing system.

System and Architecture

As discussed above, traditional interactive software systems provide static and generic content delivery messages and user experience components. Consequently, the content delivery message and user experience components provided to a given user is typically completely detached from the current content being delivered, and/or the individual user's historical data related to the current content being delivered, and/or variations in the emotional state of the user, and/or the individual user's sensitivities and the potential emotional effect of the current content being provided to the individual user, and/or the culture/customs associated with the individual user. This, in turn can yield highly undesirable results.

Inefficiencies associated with updating traditional interactive software systems are an additional long-standing shortcoming. This is because, even if potential improvements to traditional interactive software systems become available, the costs associated with developing, testing, releasing, and debugging a new version of the interactive software system each time a new or improved analytic algorithm is discovered, or defined, will often outweigh the benefits gained by a user, or even a significant sub-set of users.

Embodiments of the present disclosure address some of the long-standing shortcomings associated with traditional interactive software systems by providing an interactive software system to dynamically modify the form of a content delivery message and/or the provided user experience components by selecting one or more content delivery messages and/or user experience components based on a predicted emotional impact on the user of the current content being delivered, before, or as, the current content is delivered to the user.

According to one embodiment, which user content delivery message and/or experience components, or combination of user experience components, are selected depends upon the current content to be delivered and user profile data associated with a user including, but not limited to, user historical context data and/or user feedback and emotional profile data. As a result, embodiments of the present disclosure improve the technical fields of user experience, customer service, and data flow and distribution by enabling an interactive software system to provide a more thorough and customized user experience to the user.

In addition, by minimizing, or potentially eliminating, the processing and presentation of inappropriate and/or irrelevant content delivery messages and/or user experience components, implementation of embodiments of the present disclosure allows for significant improvement to the field of data collection and data processing. As one illustrative example, by minimizing, or potentially eliminating, the processing and presentation of inappropriate and/or irrelevant content delivery messages and/or user experience components to a user, implementation of embodiments of the present disclosure allows for relevant data collection using fewer processing cycles and less communications bandwidth. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In accordance with one embodiment, an interactive software system is provided for use by one or more users. In various embodiments, the interactive software system is any interactive software system as discussed herein, as known in the art at the time of filing, and/or as developed after the time of filing.

For example, in various embodiments, the interactive software system provided can be, but is not limited to, any software system that provides an interactive user experience to its users and is implemented on a computing system, accessed through one or more servers, accessed through a network, accessed through a cloud, and/or provided through any computing system or by any means as discussed herein, as known in the art at the time of filing, and/or as developed after the time of filing.

The interactive software systems provided can be, but is not limited to, web-based, online, and/or computing system implemented personal and/or business tax preparation systems; web-based, online, and/or computing system implemented personal and/or business financial management systems, services, packages, programs, modules, or applications; web-based, online, and/or computing system implemented personal and/or business management systems, services, packages, programs, modules, or applications; web-based, online, and/or computing system implemented personal and/or business accounting and/or invoicing systems, services, packages, programs, modules, or applications; and various other personal and/or business electronic data management systems, services, packages, programs, modules, or applications, whether known at the time of filling or as developed later.

In one embodiment, one or more content types that are likely to be delivered via one or more content delivery messages through the interactive software system are identified.

Herein the term "content" refers to the wording of the subject matter/information that is provided via data, messages, and/or any other form of conveying information as discussed herein, and/or as known in the art at the time of filing, and/or as developed after the time of filing.

As a specific illustrative example, various forms of content include the wording data that is to be provided to a user of the interactive software system, i.e., the actual text, audio, video, or symbolic message, such as, but not limited to, informative data, questions, notices, alerts, visual representations, audio representations, pop up displays, etc. As an even more specific illustrative example, in various embodiments, content can include wording data conveying information such as an expected refund, an expected credit, traffic alerts, calendar reminders, and/or any one or more of an almost infinite number of types of information that can be conveyed to the user of an interactive software system by the interactive software system.

Herein the term "content type" includes, but is not limited to, the subject matter or type of content, e.g., the subject matter of the information, that is provided via data, messages, and/or any other form of conveying information as discussed herein, and/or as known in the art at the time of filing, and/or as developed after the time of filing.

As a specific illustrative examples, in various embodiments, content type can include, but is not limited to, a refund notification, a traffic accident notification, an upcoming calendar appointment, a missed calendar appointment, a budget overrun, a bill payment, or any other type of content as discussed herein, and/or as known in the art at the time of filing, and/or as becomes available/known after the time of filing.

In one embodiment, once one or more content types that are likely to be delivered via one or more content delivery messages through the interactive software system are identified, one or more content delivery messages are defined for each content type.

Herein the term "content delivery message" refers to entire message delivered including specific wording of text, audio, video, visual, or any other data and formats/forms of data used to convey information, and/or the mechanisms used to relay the specific wording or the text, audio, video, visual, or any other data and formats/forms of data used to convey information as discussed herein, and/or as known in the art at the time of filing, and/or as developed after the time of filing. Specific examples of content delivery messages include the wording of text, audio, video, visual, or any other data arrangement/format used to convey information and the e-mails, video, audio, icons, pop-up displays etc. used to convey the information.

As an even more specific example, content delivery messages include not only the specific wording of the content delivery message, but also the tone and/or way the content is delivered, e.g., as good news, bad news, happy/upbeat, unhappy/down beat, etc. For any given content, multiple versions of content delivery messages, each with different wording and a different tone, nuance, presentation format, and/or vehicle/medium are possible which convey the content in a different tone.

In various embodiments, for any given content and content type, multiple versions of content delivery messages are possible and defined, each with different wording and a different tone, nuance, presentation format, and/or vehicle/medium which convey the same content in a different manner with a different tone/nuance.

As a specific illustrative example, for content type indicating that a user is expected to receive a tax refund of $100 the following content delivery messages could be defined: "congratulations, it is estimated you will receive a $100 refund" delivered using an upbeat audio tone, video display, avatar, or pop-up message; "it is estimated you will receive a $100 refund" delivered using a monotone or neutral audio tone, video display, avatar or pop-up message; "unfortunately, it appears you will receive a refund of only $100 this year" delivered using a somber audio tone, video display, avatar, or pop-up message; etc.

In one embodiment, once one or more content delivery messages are defined for each content type content delivery message data is generated for each of the content delivery messages and the content delivery message data for each of the content delivery messages is correlated with the respective content delivery type.

As noted above, in various embodiments, for any given content and content type multiple versions of content delivery messages are possible and defined, each with different wording and a different tone, nuance, presentation format, and/or vehicle/medium which convey the same content in a different manner with a different tone/nuance. In one embodiment, for each content type all the content delivery messages defined associated with that content type are correlated to the content type.

As a specific illustrative example, as noted above, in one embodiment, for a content type indicating that a user is expected to receive a tax refund of $100 the following content delivery messages could be defined: "congratulations, it is estimated you will receive a $100 refund" delivered using an upbeat audio tone, video display, avatar, or pop-up message; "it is estimated you will receive a $100 refund" delivered using a monotone or neutral audio tone, video display, avatar or pop-up message; "unfortunately, it appears you will receive a refund of only $100 this year" delivered using a somber audio tone, video display, avatar, or pop-up message; etc.

In this specific illustrative example, content delivery message data for each of the above content delivery messages is correlated to the content type indicating that a user is expected to receive a tax refund.

In one embodiment, once the content delivery message data for each of the content delivery messages is correlated with the respective content delivery type, the correlated content delivery message data is stored in one or more memory systems such as any memory system discussed herein, and/or as known in the art of time of filing, and/or as developed after the time of filing.

In one embodiment, user experience components that can be used and/or combined to create a user experience that will be provided through the interactive software system are identified.

As discussed herein, a user experience includes the practical, experiential, affective, significant, and/or valuable aspects of human/software interaction. Consequently, in one embodiment, the user experience components include the various elements that make up a user experience appropriate to, and provided along with, the content display message.

In various embodiments, the user experience components include, but are not limited to, individualized user interview questions and question sequences, user interfaces, interface displays, sub-displays, images, side bar displays, pop-up displays, alarms, music, backgrounds, avatars, highlighting mechanisms, icons, assistance resources, user recommendations, supplemental actions and recommendations, and/or any other components that individually, or in combination, create a user experience, as discussed herein, and/or as known in the art at the time of filing, and/or as developed after the time of filing.

In one embodiment, once one or more user experience components are defined that are capable of combination to provide a user experience through the interactive software system, user experience component data representing the defined one or more user experience components to be displayed along with the content display message is generated and stored.

In one embodiment, user profile data associated with a user is obtained, including, but not limited to, user historical context data and/or user feedback and emotional profile data.

Herein, the term "user profile data" includes but is not limited to: user historical context data representing the individual user's historical data and experiences related to content being delivered; peer group historical context data representing historical data and experiences of peers of the user and/or other users similar the user related to content being delivered; and/or user feedback and emotional profile data representing the feedback and/or historical data from the user indicating the sensitivities of the individual user and/or the user's culture/society; and/or emotional state data indicating an emotional state of a user.

Herein, the term "user historical context data" includes, but is not limited to, historical financial data, historical use data, historical feedback data, historical profile data, historical emotional state data, historical demographic data, historical employment data, and/or any other historical data associated with a user, and/or peers or similarly situated other users, that is related to current content to be delivered to a user as discussed herein, and/or as known in the art at the time of filing, and/or as developed after the time of filing. As a specific example, for content indicating a tax refund and amount, the user historical context data could include data indicating the user's historical refund amounts.

As discussed below, in various embodiments, the user historical context data is used to determine the emotional impact, and/or appropriateness, of the various content delivery messages and/or user experience components represented in the content delivery message data and/or user experience component data. As also discussed below, in various embodiments, the user historical context data provides personalized background information about the user that allows the selection of the appropriate content delivery message and/or user experience component.

Continuing with the specific illustrative example discussed above, assume again that in one embodiment, for a content type indicating that a user is expected to receive a tax refund of $100 the following content delivery messages could be defined: "congratulations, it is estimated you will receive a $100 refund" delivered using an upbeat audio tone, video display, avatar, or pop-up message; "it is estimated you will receive a $100 refund" delivered using a monotone or neutral audio tone, video display, avatar or pop-up message; "unfortunately, it appears you will receive a refund of only $100 this year" delivered using a somber audio tone, video display, avatar, or pop-up message; etc.

However, assume in this specific illustrative example that the user historical context data indicates that the user has received a refund of over $1000 for the past five years. In this specific illustrative example, it would be clear that the appropriate content delivery message would either be "it is estimated you will receive a $100 refund" delivered using a monotone or neutral audio tone, video display, avatar or pop-up message, or "unfortunately, it appears you will receive a refund of only $100 this year" delivered using a somber audio tone, video display, avatar, or pop-up message.

In various embodiments, the user historical context data is obtained from any one of various sources including, but not limited to: user data previously obtained by the interactive software systems; one or more other software systems, such as any of the software systems discussed herein, and/or as known in the art of time of filing, and/or as developed after the time of filing; one or more websites associated with the user, such as financial institution websites, and/or as obtained through screen scraping or similar technology; the user and data input from the user; and/or any other source of user historical context data as discussed herein, and/or as known in the art at the time of filing, and/or as developed after the time of filing.

In one embodiment, the user profile data includes user feedback and emotional profile data. Herein, the term "user feedback and emotional profile data" includes, but is not limited to, any data received from the user representing the feedback and/or relevant data about the user indicating the sensitivities of the individual user and/or the user's culture/society as discussed herein, and/or as known in the art at the time of filing, and/or as developed after the time of filing.

As a specific example, in various embodiments, user feedback and emotional profile data can include, but is not limited to: data received from the user regarding the appropriateness of previously provided content delivery messages and/or user experience components; data indicating the user's marital status, and/or changes in the user's marital status; the number of user dependents, and/or changes in the number of user dependents; the user's employment/employment status; and/or changes in the user's employment/employment status; the heritage/culture, and/or geographic background, of the user; data indicating accepted norms and respectful interaction protocols associated with the heritage/culture, and/or geographic background, of the user; the current geographic location of the user, and/or changes in the geographic location of the user; data indicating accepted norms and respectful interaction protocol associated with the current geographic location of the user; and/or any other data indicating the sensitivities of the individual user and/or the user's culture/society as discussed herein, and/or as known in the art at the time of filing, and/or as developed after the time of filing.

In various embodiments, the user feedback and emotional profile data is obtained from any one of various sources including, but not limited to: user data previously obtained by the interactive software system; one or more other software systems, such as any of the software system discussed herein, and/or as known in the art of time of filing, and/or as developed after the time of filing; one or more websites associated with the user, such as financial institution websites, and/or as obtained through screen scraping or similar technology; the user and data input from the user; and/or any other source of user historical context data as discussed herein, and/or as known in the art at the time of filing, and/or as developed after the time of filing.

In one embodiment, the user feedback and emotional profile data includes emotional state data.

As used herein, the term "emotional state data" refers to a quantitative representation of a predicted emotional state and/or combination of emotional states and/or physiological, behavioral, and/or experiential indications of an emotional state and/or a combination of emotional states.

In one embodiment, the emotional state data is representative of one or more of the following emotional states: a tense emotional state; a nervous emotional state; a stressed emotional state; an upset emotional state; a frustrated emotional state; a sad emotional state; a depressed emotional state; a bored emotional state; a fatigued emotional state; an alert emotional state; an excited emotional state; an elated emotional state; a happy emotional state; a contented emotional state; a serene emotional state; a relaxed emotional state; and/or a calm emotional state.

In various embodiments, the emotional state data includes, but is not limited to, data acquired from the user's own characterization of his or her emotional state; data acquired from historical user data; data acquired from a segment of users having characteristics comparable to the user; data acquired from measuring a user's heart beat; data acquired from measuring a user's eye rotation; data acquired from measuring a user's perspiration; data acquired from measuring a user's respiration; data acquired from measuring a user's oxygen saturation; data acquired from measuring a user's blood pressure; data acquired from measuring a user's skin temperature; data acquired from measuring a user's muscle tension; data acquired from measuring a user's neural activity; data acquired from measuring a user's eye blinking; data acquired from measuring one or more of a user's facial expressions; data acquired from measuring a user's voice and/or speech; and/or data acquired from measuring a user's interaction with hardware associated with the interactive software system.

In one embodiment, the emotional state data is data acquired from the user's own characterization of his or her emotional state. For example, in one embodiment, the user is presented with a pop-up requesting information about the user's emotional state. Then, in one embodiment, the emotional state data is the data provided by the user via the pop-up. In one embodiment, the emotional state data is data associated with the user's attempts to seek assistance resources via the interactive software system.

In one embodiment, the emotional state data is determined based on the user historical context data, that is, data associated with the user's previous interactions with the interactive software system. For example, in one embodiment, if a user of a financial management service associated with an interactive software system requests information about his or her restaurant budget to determine whether it is feasible to eat out that evening, the financial management service relies on historical user data to estimate the amount of money the user spends when eating out. Then, in one embodiment, if the user does not have enough money in his or her budget to eat out, the financial management service associated with an interactive software system predicts the emotional state of the user and selects the content delivery message and/or user experience components to tailor the user experience accordingly.

In one embodiment, the emotional state data is data associated with a segment of users having characteristics comparable to the user. For example, in one embodiment, if a user of a financial management service associated with an interactive software system requests information about his or her entertainment budget to determine whether it is feasible to go to the movies that evening, the financial management service relies on data associated with a segment of users having characteristics comparable to the user to estimate the amount of money the user will spend when going to the movies. Then, in one embodiment, if the user does not have enough money in his or her budget to go to the movies, the financial management service associated with an interactive software system predicts the emotional state of the user and selects user experience components to tailor the user experience accordingly.

In various embodiments, emotional state monitoring systems are used to collect the user emotional state data including, but not limited to, one or more of the following: a heart rate monitor associated with an interactive software system, an eye tracker associated with an interactive software system; an emotional state monitoring system associated with an interactive software system to measure a user's skin conductance level; an emotional state monitoring system associated with an interactive software system to measure a user's respiration rate; an emotional state monitoring system associated with an interactive software system to measure a user's oxygen saturation level; an emotional state monitoring system associated with an interactive software system to measure a user's blood pressure level; an emotional state monitoring system associated with an interactive software system to measure a user's skin temperature; an emotional state monitoring system associated with an interactive software system to measure a user's muscle tension level; an emotional state monitoring system associated with an interactive software system to measure a user's neural activity; an emotional state monitoring system associated with an interactive software system to measure a user's eye blink rate; an emotional state monitoring system associated with an interactive software system to measure a user's facial muscle movement; an emotional state monitoring system associated with an interactive software system to measure a user's acoustic characteristics; and/or an emotional state monitoring system associated with an interactive software system to measure a user's interaction with hardware associated with an interactive software system.

In various embodiments, the emotional state monitoring systems include any emotional state monitoring system as described herein, as known in the art at the time of filing, and/or as developed after filing.

In one embodiment, current content data representing current content to be provided to the user through the interactive software system is accessed.

In one embodiment, current content data that is going to be delivered to the user through the interactive software system is accessed before the current content is provided to the user.

In one embodiment, once current content data representing current content to be provided to the user through the interactive software system is accessed, the current content data is scanned to determine the content type associated with the current content data.

In one embodiment, one or more emotional effect prediction analytics modules are provided implementing one or more emotional effect prediction algorithms.

In one embodiment, the one or more emotional effect prediction analytics modules implement one or more emotional effect prediction algorithms that are used to predict an emotional effect on the user of the current content represented by the current content data based on analysis of the user profile data and the current content data.

In one embodiment, the one or more emotional effect prediction analytics modules are "pluggable," e.g., interchangeable, emotional effect prediction analytics modules to be used with one or more interactive software systems that can be selected, interfaced with, and interchanged, without requiring the redeployment of either the interactive software system or any individual analytics module. In this way, different types of user profile data and current content data can be analyzed and utilized by a single interactive software system or version, or multiple interactive software systems and/or versions, and different analytic algorithms can be interchangeably deployed.

In one embodiment, once one or more emotional effect prediction analytics modules are provided implementing one or more emotional effect prediction algorithms, the one or more emotional effect prediction analytics modules are provided access to the current content data and the user profile data.

In one embodiment, once the one or more emotional effect prediction analytics modules are provided access to the current content data and the user profile data, the one or more emotional effect prediction analytics modules analyze the current content data and the user profile data to predict an emotional effect on the user of the current content represented by the current content data.

Continuing with the specific illustrative example discussed above, assume again that the current content data indicates a user is expected to receive a tax refund of $100. Further assume in this specific illustrative example that the user historical context data of the user profile data indicates that the user has received a refund of over $1000 for the past five years.

In this specific illustrative example, the one or more emotional effect prediction analytics modules and one or more emotional effect prediction algorithms would predict that the current content data would have a negative effect on the user's emotional state based on analysis of the user profile data indicating the user typically receives over $1000 and the current content data indicating the user is expected to receive only $100.

In one embodiment, once the one or more emotional effect prediction analytics modules analyze the current content data and the user profile data to predict an emotional effect on the user of the current content represented by the current content data, predicted emotional effect data is generated indicating the predicted emotional effect on the user of the current content represented by the current content data.

In one embodiment, once predicted emotional effect data is generated indicating the predicted emotional effect on the user of the current content represented by the current content data, based, at least in part, on the identified content type associated with the current content data and the predicted emotional effect on the user of the current content, an appropriate one of the one or more content display messages for the identified content type associated with the current content data and/or a portion of the user experience component data representing one or more selected user experience components of the defined one or more user experience components is/are selected.

In one embodiment, based, at least in part, on the predicted emotional effect on the user of the current content an appropriate content display message and/or one or more user experience components is/are selected that are predicted to maintain, or improve, the emotional state of a user during and after the user's interaction with the interactive software system.

As a specific example, in a tax preparation service provided by an interactive software system, if an upcoming tax topic will require several questions and interactions to complete, an appropriate content display message and/or one or more user experience components is/are selected depending on the predicted emotional effect on the user of the current content.

As an example, in one embodiment, if the predicted emotional effect on the user of the current content is positive, an appropriate content display message and/or one or more user experience components is/are selected to reflect this predicted emotional effect and provide a neutral or "matter of fact" user experience. As another example, in one embodiment, if the predicted emotional effect on the user of the current content is negative, an appropriate content display message and/or one or more user experience components is/are selected to reflect this predicted emotional effect and provide a gentler and more upbeat user experience, such as providing the user with soothing background colors and/or music as part of the user experience.

In one embodiment, based, at least in part, on the predicted emotional effect on the user of the current content an appropriate content display message and/or one or more user experience components is/are selected that provide the user with a user experience that presents any content display messages, questions and/or suggestions in a specific order.

For example, in one embodiment, if the predicted emotional effect on the user of the current content is determined to be negative, an appropriate content display message and/or one or more user experience components is/are selected to provide the user with a user experience that avoids any difficult/unpleasant questions and/or suggestions.

According to one embodiment, an appropriate content display message and/or one or more user experience components is/are selected to provide the user with an alert; insert human resource assistance; and/or any other form of user assistance when the user is, or is predicted to be, in a nervous, frustrated, stressed, and/or upset emotional state. If the user is, or is predicted to be, in a nervous, frustrated, stressed, and/or upset emotional state, an appropriate content display message and/or one or more user experience components is/are selected to provide an alert to the user for a customer service professional and/or for a system administrator, according to one embodiment.

Furthermore, in various embodiments, the selection of an appropriate content display message and/or one or more user experience components depends at least in part on whether the user is the end customer or a human service provider for the customer. For example, if the user is an accountant interacting with the interactive software system based on the accountant's client's behalf, an appropriate content display message and/or one or more user experience components is/are selected to adapt the user experience to the user's status as a human service provider.

In various embodiments, the experience level of the user is taken into consideration when selecting an appropriate content display message and/or one or more user experience components. For example, in a tax preparation application, if the user is an accountant, it may be assumed that the user has a higher level of proficiency in tax preparation than that of a non-accountant user. As a result, if a negative effect is predicted, this effect may not be considered to be as important to an accountant user as opposed to an end customer user. Therefore, in one embodiment, an appropriate content display message and/or one or more user experience components selected for an accountant user is different than those selected for a non-accountant, or end customer user.

Thus, the interactive software system can adapt to the user's profession and/or level of experience when selecting an appropriate content display message and/or one or more user experience components. In one embodiment, if the user is an accountant, the interactive software system may assume that the user has certain knowledge and/or a preferred approach for specific tasks than users who are not accountants. Based on this assumption, an appropriate content display message and/or one or more user experience components may then be selected to provide an appropriate user experience.

As one example, an interactive software system that provides accounting services for small businesses may select an appropriate content display message and/or one or more user experience components based on whether there are a significant number of overdue invoices or whether the business's overall cash flow has been negative for some length of time. Additionally, because an accountant user may be less emotionally involved in overdue invoices or negative cash flow than the small business owner for whom the accountant is providing services, an appropriate content display message and/or one or more user experience components selected for an accountant user may differ than those selected for an owner user.

By selecting an appropriate content display message and/or one or more user experience components to present a customized user experience to a user, the present disclosure allows for significant improvement to the technical fields of user experience, customer service, data collection, and data processing. Indeed, by minimizing and potentially eliminating the presentation of an irrelevant user experience to a user, embodiments of the present disclosure use fewer human resources like time and energy by not selecting an irrelevant an appropriate content display message and/or one or more user experience components.

Similarly, by selecting an appropriate content display message and/or one or more user experience components to provide a customized user experience, embodiments of the present disclosure actually improve the efficiency of the user experience by presenting a user experience that makes a user's interaction with an interactive software system easier and less stressful.

Furthermore, by allowing for more relevant interactions between a user and an interactive software system, embodiments of the present disclosure require fewer processing cycles and less communications bandwidth. As a result, embodiments of the present disclosure allow for improved processor performance, more efficient use of memory access and data storage capabilities, reduced communication channel bandwidth utilization, faster communications connections, and improved user efficiency. Consequently, computing and software systems are transformed into faster and more operationally efficient devices and systems by implementing and/or providing the embodiments of the present disclosure. Therefore, implementation of embodiments of the present disclosure amounts to significantly more than an abstract idea and also provides several improvements to multiple technical fields.

Continuing with the specific illustrative example discussed above, assume for the content type indicating that a user is expected to receive a tax refund of $100 the following content delivery messages are defined: "congratulations, it is estimated you will receive a $100 refund" delivered using an upbeat audio tone, video display, avatar, or pop-up message; "it is estimated you will receive a $100 refund" delivered using a monotone or neutral audio tone, video display, avatar or pop-up message; "unfortunately, it appears you will receive a refund of only $100 this year" delivered using a somber audio tone, video display, avatar, or pop-up message; etc.

Also assume again that, in this specific illustrative example, the user historical context data indicates that the user has received a refund of over $1000 for the past five years. As noted above, in this specific illustrative example, the one or more emotional effect prediction analytics modules and one or more emotional effect prediction algorithms would predict that the current content data would have a negative effect on the user's emotional state based on analysis of the user profile data indicating the user typically receives a $1000 and the current content data indicating the user is expected to receive only $100.

As a result, in this specific illustrative example, either the content display message "it is estimated you will receive a $100 refund" delivered using a monotone or neutral audio tone, video display, avatar or pop-up message, or the content display message "unfortunately, it appears you will receive a refund of only $100 this year" delivered using a somber audio tone, video display, avatar, or pop-up message would be selected.

In one embodiment, once, based at least in part, on the identified content type associated with the current content data and the predicted emotional effect on the user of the current content, an appropriate content display message and/or one or more user experience components is/are selected, the user is provided with a portion of the content display message data representing the selected appropriate one of the one or more content display messages for the identified content type associated with the current content data and/or a portion of the user experience component data representing one or more selected user experience components of the defined one or more user experience components.

In one embodiment, once the user is provided with a portion of the content display message data representing the selected appropriate one of the one or more content display messages for the identified content type associated with the current content data and/or a portion of the user experience component data representing one or more selected user experience components of the defined one or more user experience components, the user is provided the opportunity to provide user feedback data regarding the appropriateness, and/or level of respect, associated with the content display message and/or user experience components provided. In one embodiment, this user feedback data is then incorporated and used to modify the user profile data so that subsequent content display message and/or user experience components are appropriate.

Continuing with the specific illustrative example discussed above, recall that either the content display message "it is estimated you will receive a $100 refund" delivered using a monotone or neutral audio tone, video display, avatar or pop-up message, or the content display message "unfortunately, it appears you will receive a refund of only $100 this year" delivered using a somber audio tone, video display, avatar, or pop-up message was selected.

Assume, that in this specific illustrative example, the content display message "it is estimated you will receive a $100 refund" delivered using a monotone or neutral audio tone, video display, avatar or pop-up message was provided to the user. Further assume, that in this specific illustrative example once the content displayed message was delivered to the user, the user provided feedback indicating that the user felt that the content delivery message should have been more sympathetic to the fact that the user had received one $\frac{1}{10}$ of the user's expected tax refund.

Consequently in this specific illustrative example, the user profile data associated with the user would be modified so that in future cases the content delivery message selected would be the content display message "unfortunately, it appears you will receive a refund of only $100 this year" delivered using a somber audio tone, video display, avatar, or pop-up message.

In one embodiment, in order to tailor and/or evolve the written wording or the verbal intonation or the three-dimension visual interactions of the content of the content delivery messages more effectively, A/B tests are conducted in samples of users. In one embodiment this testing is automatically conducted by asking whether a given user wants to participate or not, i.e., the users can opt-in.

In these embodiments, the process of selecting the appropriate content display message and/or user experience components can automatically adjust over time and be constantly adapting. Thus the appropriate content display message and/or user experience components can evolve over time, even when the underlying logic of the interactive software system does not change, as language expressions change over time and as verbal or visual communication patterns change over time. Thus, the interactive software system can adapt to changing social patterns and behaviors.

The appropriate content delivery message can further be tailored by using the user affinities, so for a user that is a fan of basketball, an appropriate content delivery message can be generated and selected using basketball analogies and/or basketball-oriented language. This analysis can be used for all sports, or activities, or vocations.

FIG. 1 illustrates a block diagram of a production environment 100 for implementing a system for adapting a user experience provided through an interactive software system to the content being delivered and the predicted emotional impact on the user of that content, according to one embodiment.

According to one embodiment, production environment 100 includes interactive software system computing environment 110 and user computing environment 190. In one embodiment, computing environments 110 and 190 are communicatively coupled to each other with communication channel 101.

In one embodiment communication channel 101 is any communications channel as discussed herein, as known in the art at the time of filing, and/or as known in the art after the time of filing. Those of skill in the art will readily recognize that in various embodiments, communication channel 101 can be implemented across two or more communications channels.

According to one embodiment, interactive software system computing environment 110 represents one or more computing systems such as, but not limited to, a server, a computing cabinet, and/or distribution center that is configured to receive, execute, and host one or more interactive software systems for access by one or more users. In one embodiment, interactive software system computing environment 110 includes interactive software system 111 and content delivery message and user experience system 120 for individualizing a user experience, according to one embodiment. Content delivery message and user experience system 120 includes various components, databases, engines, modules, and data to facilitate the customization of a content delivery message and user experience.

In one embodiment, content delivery message and user experience system 120 includes content types store 130, user experience components store 140, user profile data store 150, emotional effect prediction analytics module 160, and content delivery message and user experience customization engine 170.

In various embodiments, emotional effect prediction analytics module 160 is an interchangeable or pluggable component within production environment 100 and enables production environment 100 to provide a system for adapting a user experience provided through an interactive software system to the content being delivered and the predicted emotional impact on the user of that content with different algorithms or analysis routines by overwriting/replacing one interchangeable analytics module with another, without altering other parts of production environment 100, i.e., interactive software system 111 itself, according to one embodiment.

In accordance with one embodiment of a process for adapting a user experience provided through an interactive software system to the content being delivered and the predicted emotional impact on the user of that content, includes providing interactive software system 111 through which a content delivery message, such as represented by selected content delivery message C1 data and user experience components, such as represented by selected user experience component data 145, are to be provided to a user of interactive software system 111, in one embodiment through user experience interface 180 of interactive software system 111 and display/access device 193 of user computing system 191.

In one embodiment, one or more content types, represented by content type A 131, content type B 133, and content type C 135 of content types store 130 in FIG. 1, to potentially be provided to a user through user experience interface 180 of interactive software system 111 and display/access device 193 of user computing system 191 are identified. Content delivery message data, such as, but not limited to: content delivery message A1 data and content delivery message A2 data of content type A 131; content delivery message B1 data and content delivery message B2 data of content type B 133; and selected content delivery message C1 data and content delivery message C2 data of content type C 135, is generated representing one or more content delivery messages for each identified content type to potentially be provided to a user through user experience interface 180 of interactive software system 111 and display/access device 193 of user computing system 191.

As shown in FIG. 1, in one embodiment, the portion of content delivery message data such as: content delivery message A1 data and content delivery message A2 data; content delivery message B1 data and content delivery message B2 data; and selected content delivery message C1 data and content delivery message C2 data of FIG. 1, representing each of the content delivery messages for each content type, such as content type A 131; content type B 133, and content type C 135 in FIG. 1, is correlated with the associated content type and the correlated content delivery message data is stored in a partitioned correlated content delivery message data section of a memory system, such as content types store 130 of FIG. 1.

In one embodiment, one or more user experience components are defined that are capable of combination to potentially provide a user experience to a user through user experience interface 180 of interactive software system 111 and display/access device 193 of user computing system 191. In one embodiment, user experience component data representing the defined one or more user experience components, such as user experience component data 141; user experience component data 143; selected user experience component data 145; and user experience component data 147 of FIG. 1, is generated and stored in a partitioned user experience component data section of a memory system, such as user experience components store 140 of FIG. 1.

In one embodiment, user profile data associated with a user, such as user profile data 151 of user profile data store 150 of FIG. 1, is obtained, including, but not limited to user historical context data and/or user feedback and emotional profile data.

In one embodiment, current content data, such as current content data 113 of FIG. 1, representing current content to be provided to the user through user experience interface 180 of interactive software system 111 and display/access device 193 of user computing system 191 of FIG. 1, is accessed and the content type associated with the current content data is determined.

In one embodiment, one or more emotional effect prediction analytics modules, such as emotional effect prediction analytics module 160 of FIG. 1, are provided implementing one or more emotional effect prediction algorithms, such as emotional effect prediction algorithm 161 of FIG. 1. In one embodiment, the one or more emotional effect prediction analytics modules, such as emotional effect prediction analytics module 160 of FIG. 1, are provided access to current content data 113 and the user profile data 151.

In one embodiment, current content data 113 and user profile data 151 are analyzed by the one or more emotional effect prediction algorithms, such as emotional effect prediction algorithm 161 of FIG. 1 of the one or more emotional effect prediction analytics modules, such as emotional effect prediction analytics module 160 of FIG. 1, to predict an emotional effect on the user of the current content represented by current content data 113.

In one embodiment, as a result of the analysis of current content data 113 and user profile data 151, predicted emotional effect data, such as predicted emotional effect data 163 of FIG. 1, is generated indicating the predicted emotional effect on the user of the current content represented by current content data 113.

In one embodiment, based, at least in part, on the identified content type associated with the current content data, such as current content data 113 of FIG. 1, and the predicted emotional effect on the user of the current content, an appropriate one of the one or more content delivery messages for the identified content type associated with the current content data, such as the selected content delivery message represented by selected content delivery message C1 data of FIG. 1, is selected.

In one embodiment, based, at least in part, on the predicted emotional effect on the user of the current content, such as current content data 113 of FIG. 1, a portion of the user experience component data, such as selected user experience component data 145 of FIG. 1, is selected representing one or more selected user experience components of the defined one or more user experience components, such as those represented by: user experience component data 141; user experience component data 143; selected user experience component data 145; and user experience component data 147 of FIG. 1, and the one or more selected user experience components are used to transform a user experience provided through user experience interface 180 of interactive software system 111 and display/access device 193 of user computing system 191 of FIG. 1, into a user experience adapted to the predicted emotional effect on the user of the current content.

In one embodiment, the user is provided with a portion of the content delivery message data, such as selected content delivery message C1 data of FIG. 1, representing the selected appropriate one of the one or more content delivery messages for the identified content type associated with the current content data, and/or with the a portion of the user experience component data, such as selected user experience component data 145 of FIG. 1, to provide a user experience adapted to the predicted emotional effect on the user of the current content through user experience interface 180 of interactive software system 111 and display/access device 193 of user computing system 191 of FIG. 1.

Process

In accordance with one embodiment, a process for adapting a user experience provided through an interactive software system to the content being delivered and the predicted emotional impact on the user of that content includes providing an interactive software system through which content delivery message and user experience components are to be provided to a user of the interactive software system.

In one embodiment, one or more content types to potentially be provided to a user through the interactive software system are identified and content delivery message data is generated representing one or more content delivery messages for each identified content type to potentially be provided to a user through the interactive software system. In one embodiment, the portion of content delivery message data representing each of the content delivery messages for each content type is correlated with the associated content type and the correlated content delivery message data is stored in a partitioned correlated content delivery message data section of a memory system.

In one embodiment, user profile data associated with a user is obtained, including, but not limited to user historical context data and/or user feedback and emotional profile data. In one embodiment, current content data representing current content to be provided to the user through the interactive software system is accessed and the content type associated with the current content data is determined.

In one embodiment, one or more emotional effect prediction analytics modules are provided implementing one or more emotional effect prediction algorithms and the one or more emotional effect prediction analytics modules are provided access to the current content data and the user profile data. In one embodiment, the current content data and the user profile data are analyzed by the one or more emotional effect prediction algorithms of the one or more emotional effect prediction analytics modules to predict an emotional effect on the user of the current content represented by the current content data.

In one embodiment, as a result of the analysis of the current content data and the user profile data, predicted emotional effect data is generated indicating the predicted emotional effect on the user of the current content represented by the current content data.

In one embodiment, as a result of the analysis of the current content data and the user profile data, predicted emotional effect data is generated indicating the predicted emotional effect on the user of the current content represented by the current content data.

In one embodiment, based, at least in part, on the identified content type associated with the current content data and the predicted emotional effect on the user of the current content, an appropriate one of the one or more content delivery messages for the identified content type associated with the current content data is selected.

In one embodiment, the user is provided with a portion of the content delivery message data representing the selected appropriate one of the one or more content delivery messages for the identified content type associated with the current content data.

Figure 2:
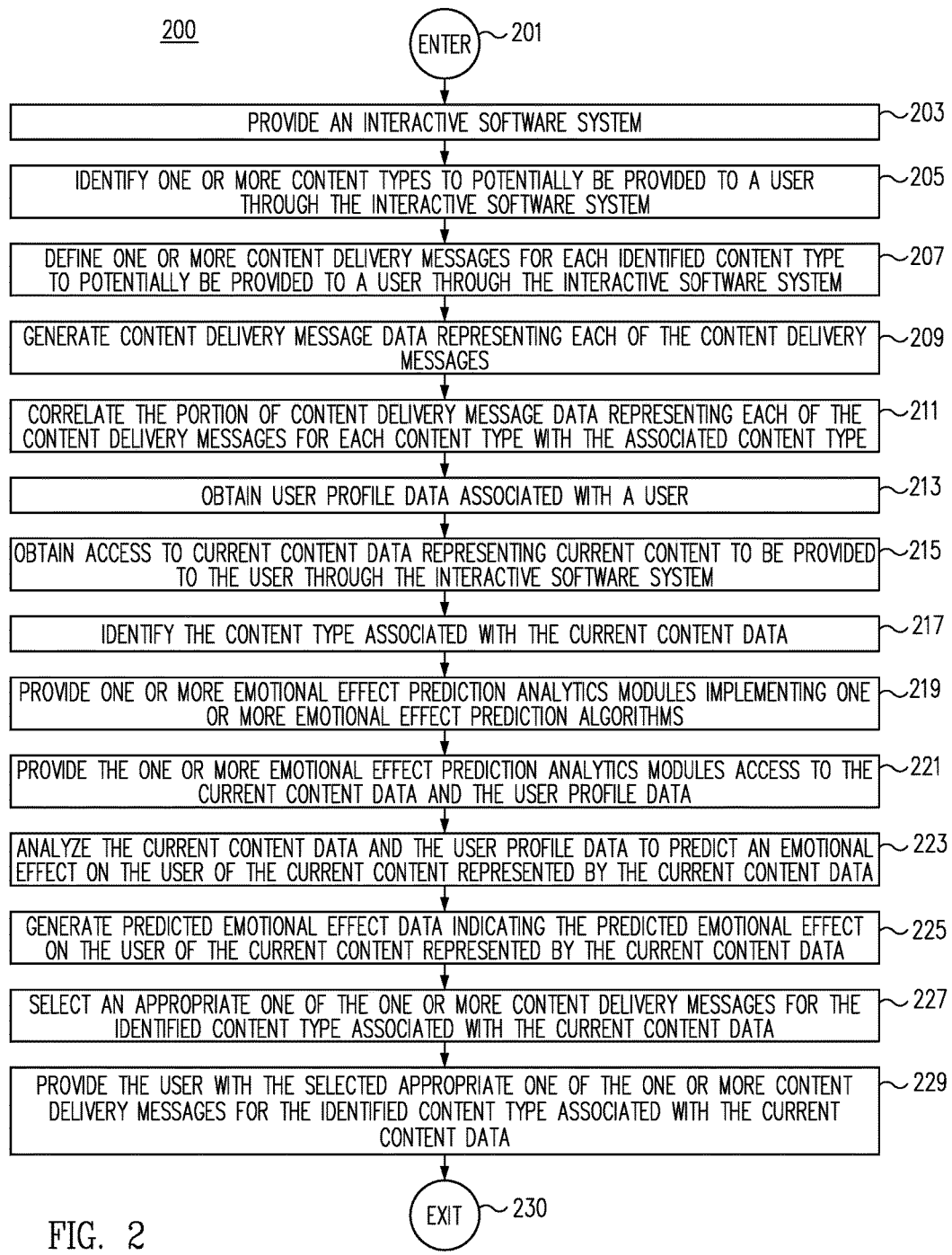
FIG. 2 is a flow diagram for adapting a user experience provided through an interactive software system to the content being delivered and the predicted emotional impact on the user of that content in accordance with one embodiment.

FIG. 2 is a flow chart representing one example of a process 200 for adapting a user experience provided through an interactive software system to the content being delivered and the predicted emotional impact on the user of that content in accordance with one embodiment.

As seen in FIG. 2, in one embodiment, process 200 for adapting a user experience provided through an interactive software system to the content being delivered and the predicted emotional impact on the user of that content begins at ENTER OPERATION 201 and process flow proceeds to PROVIDE AN INTERACTIVE SOFTWARE SYSTEM OPERATION 203.

In one embodiment, at PROVIDE AN INTERACTIVE SOFTWARE SYSTEM OPERATION 203, an interactive software system is provided for use by one or more users. In various embodiments, the interactive software system of PROVIDE AN INTERACTIVE SOFTWARE SYSTEM OPERATION 203 is any interactive software system as discussed herein, as known in the art at the time of filing, and/or as developed after the time of filing.

For example, in various embodiments, the interactive software system provided at PROVIDE AN INTERACTIVE SOFTWARE SYSTEM OPERATION 203 can be, but is not limited to, any software system that provides an interactive user experience to its users and is implemented on a computing system, accessed through one or more servers, accessed through a network, accessed through a cloud, and/or provided through any computing system or by any means as discussed herein, as known in the art at the time of filing, and/or as developed after the time of filing.

As noted above, the effectiveness of the interactive software system of PROVIDE AN INTERACTIVE SOFTWARE SYSTEM OPERATION 203 depends upon the interactive software system's ability to provide a meaningful user experience to its users while avoiding stressing, frustrating, and/or alienating the user. Nonetheless, the content delivery message and user experience components provided to a given user using currently available interactive software systems are typically completely detached from the content being delivered, and/or the individual user's historical data related to the current content being delivered, and/or variations in the emotional state of the user, and/or the individual user's sensitivities and the potential emotional effect of the current content being provided to the individual user, and/or the culture/customs associated with the individual user and are a largely inflexible component of a given version of currently available interactive software systems. This, in turn can yield highly undesirable results and is not the type of impression that results in happy, loyal, repeat customers and, in turn, can ultimately result in lost customers.

However, the disclosed embodiments of processes 200 and 300 for adapting a user experience provided through an interactive software system to the content being delivered and the predicted emotional impact on the user of that content address these shortcomings by providing a mechanism by which an interactive software system may dynamically adjust the content delivery message and/or user experience components it provides to a user based upon the content being delivered, and/or variations in the emotional state of the user, and/or the individual user's sensitivities and the potential emotional effect of the current content being provided to the individual user, and/or the culture/customs associated with the individual user.

As a result, the fields of user experience, customer service, communication, and interactive software systems are significantly improved by implementing the various embodiments of processes 200 and 300 for adapting a user experience provided through an interactive software system to the content being delivered and the predicted emotional impact on the user of that content.

In one embodiment, once the interactive software system is provided at PROVIDE AN INTERACTIVE SOFTWARE SYSTEM OPERATION 203, process flow proceeds to IDENTIFY ONE OR MORE CONTENT TYPES TO POTENTIALLY BE PROVIDED TO A USER THROUGH THE INTERACTIVE SOFTWARE SYSTEM OPERATION 205.

In one embodiment, at IDENTIFY ONE OR MORE CONTENT TYPES TO POTENTIALLY BE PROVIDED TO A USER THROUGH THE INTERACTIVE SOFTWARE SYSTEM OPERATION 205, one or more content types that are likely to be delivered via one or more content delivery messages through the interactive software system of PROVIDE AN INTERACTIVE SOFTWARE SYSTEM OPERATION 203 are identified.

Herein the term "content" refers to the wording of the subject matter/information that is provided via data, messages, and/or any other form of conveying information as discussed herein, and/or as known in the art at the time of filing, and/or as developed after the time of filing.

As a specific illustrative example, various forms of content include the wording data that is to be provided to a user of the interactive software system, i.e., the actual wording of the text, audio, video, or symbolic message, such as, but not limited to, informative data, questions, notices, alerts, visual representations, audio representations, pop up displays, etc. As an even more specific illustrative example, in various embodiments, content can include wording data conveying information such as an expected refund, an expected credit, traffic alerts, calendar reminders, and/or any one or more of an almost infinite number of kinds of information that can be conveyed to the user of an interactive software system by the interactive software system.

Herein the term "content type" includes, but is not limited to, the subject matter or type of content, e.g., the subject matter of the information, that is provided via data, messages, and/or any other form of conveying information as discussed herein, and/or as known in the art at the time of filing, and/or as developed after the time of filing.

As a specific illustrative examples, in various embodiments, content type can include, but is not limited to, a refund notification, a traffic accident notification, an upcoming calendar appointment, a missed calendar appointment, a budget overrun, a bill payment, or any other type of content/subject matter as discussed herein, and/or as known in the art at the time of filing, and/or as becomes available/known after the time of filing.

In one embodiment, once one or more content types that are likely to be delivered via one or more content delivery messages through the interactive software system are identified at IDENTIFY ONE OR MORE CONTENT TYPES TO POTENTIALLY BE PROVIDED TO A USER THROUGH THE INTERACTIVE SOFTWARE SYSTEM OPERATION 205, process flow proceeds to DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207.

In one embodiment, at DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207, one or more content delivery messages are defined for each content type of IDENTIFY ONE OR MORE CONTENT TYPES TO POTENTIALLY BE PROVIDED TO A USER THROUGH THE INTERACTIVE SOFTWARE SYSTEM OPERATION 205.

Herein the term "content delivery message" refers to entire message delivered including specific wording of text, audio, video, visual, or any other data and formats/forms of data used to convey information, and/or the mechanisms used to relay the specific wording or the text, audio, video, visual, or any other data and formats/forms of data used to convey information as discussed herein, and/or as known in the art at the time of filing, and/or as developed after the time of filing. Specific examples of content delivery messages include the wording of text, audio, video, visual, or any other data arrangement/format used to convey information and the e-mails, video, audio, icons, pop-up displays etc. used to convey the information.

As an even more specific example, content delivery messages include not only the specific wording of the content delivery message, but also the tone and/or way the content is delivered, e.g., as good news, bad news, happy/upbeat, unhappy/down beat, etc. For any given content, multiple versions of content delivery messages, each with different wording and a different tone, nuance, presentation format, and/or vehicle/medium are possible which convey the content in a different tone.

In various embodiments, for any given content and content type of IDENTIFY ONE OR MORE CONTENT TYPES TO POTENTIALLY BE PROVIDED TO A USER THROUGH THE INTERACTIVE SOFTWARE SYSTEM OPERATION 205, multiple versions of content delivery messages are possible and defined at DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207, each with different wording and a different tone, nuance, presentation format, and/or vehicle/medium which convey the same content in a different manner with a different tone/nuance.

In one embodiment, once one or more content delivery messages are defined for each content type of IDENTIFY ONE OR MORE CONTENT TYPES TO POTENTIALLY BE PROVIDED TO A USER THROUGH THE INTERACTIVE SOFTWARE SYSTEM OPERATION 205 at DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207, process flow proceeds to GENERATE CONTENT DELIVERY MESSAGE DATA REPRESENTING EACH OF THE CONTENT DELIVERY MESSAGES OPERATION 209.

In one embodiment, at GENERATE CONTENT DELIVERY MESSAGE DATA REPRESENTING EACH OF THE CONTENT DELIVERY MESSAGES OPERATION 209, content delivery message data is generated for each of the content delivery messages of DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207.

In one embodiment, once content delivery message data is generated for each of the content delivery messages at GENERATE CONTENT DELIVERY MESSAGE DATA REPRESENTING EACH OF THE CONTENT DELIVERY MESSAGES OPERATION 209, process flow proceeds to CORRELATE THE PORTION OF CONTENT DELIVERY MESSAGE DATA REPRESENTING EACH OF THE CONTENT DELIVERY MESSAGES FOR EACH CONTENT TYPE WITH THE ASSOCIATED CONTENT TYPE OPERATION 211.

In one embodiment, at CORRELATE THE PORTION OF CONTENT DELIVERY MESSAGE DATA REPRESENTING EACH OF THE CONTENT DELIVERY MESSAGES FOR EACH CONTENT TYPE WITH THE ASSOCIATED CONTENT TYPE OPERATION 211 the content delivery message data of GENERATE CONTENT DELIVERY MESSAGE DATA REPRESENTING EACH OF THE CONTENT DELIVERY MESSAGES OPERATION 209 for each of the content delivery messages of DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207 is correlated with the respective content delivery type of IDENTIFY ONE OR MORE CONTENT TYPES TO POTENTIALLY BE PROVIDED TO A USER THROUGH THE INTERACTIVE SOFTWARE SYSTEM OPERATION 205.

As noted above, in various embodiments, for any given content and content type of IDENTIFY ONE OR MORE CONTENT TYPES TO POTENTIALLY BE PROVIDED TO A USER THROUGH THE INTERACTIVE SOFTWARE SYSTEM OPERATION 205, multiple versions of content delivery messages are possible and defined at DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207, each with different wording and a different tone, nuance, presentation format, and/or vehicle/medium which convey the same content in a different manner with a different tone/nuance. In one embodiment, at CORRELATE THE PORTION OF CONTENT DELIVERY MESSAGE DATA REPRESENTING EACH OF THE CONTENT DELIVERY MESSAGES FOR EACH CONTENT TYPE WITH THE ASSOCIATED CONTENT TYPE OPERATION 211 for each content type of IDENTIFY ONE OR MORE CONTENT TYPES TO POTENTIALLY BE PROVIDED TO A USER THROUGH THE INTERACTIVE SOFTWARE SYSTEM OPERATION 205 all the content delivery messages defined at DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207 associated with that content type are correlated to the content type.

In one embodiment, once the content delivery message data for each of the content delivery messages is correlated with the respective content delivery type at CORRELATE THE PORTION OF CONTENT DELIVERY MESSAGE DATA REPRESENTING EACH OF THE CONTENT DELIVERY MESSAGES FOR EACH CONTENT TYPE WITH THE ASSOCIATED CONTENT TYPE OPERATION 211, the correlated content delivery message data is stored in one or more memory systems such as any memory system discussed herein, and/or as known in the art of time of filing, and/or as developed after the time of filing.

In one embodiment, once the content delivery message data for each of the content delivery messages is correlated with the respective content delivery type at CORRELATE THE PORTION OF CONTENT DELIVERY MESSAGE DATA REPRESENTING EACH OF THE CONTENT DELIVERY MESSAGES FOR EACH CONTENT TYPE WITH THE ASSOCIATED CONTENT TYPE OPERATION 211, process flow proceeds to OBTAIN USER PROFILE DATA ASSOCIATED WITH A USER OPERATION 213.

In one embodiment, at OBTAIN USER PROFILE DATA ASSOCIATED WITH A USER OPERATION 213, user profile data associated with a user is obtained, including, but not limited to, user historical context data and/or user feedback and emotional profile data.

Herein, the term "user profile data" includes but is not limited to: user historical context data representing the individual user's historical data and experiences related to current content being delivered; and/or user feedback and emotional profile data representing the feedback and/or historical emotional state data from the user indicating the sensitivities of the individual user and/or the user's culture/society.

Herein, the term "user historical context data" includes, but is not limited to, historical financial data, historical use data, historical feedback data, historical profile data, historical emotional state data, historical demographic data, historical employment data, and/or any other historical data associated with a user that is related to current content to be delivered to a user as discussed herein, and/or as known in the art at the time of filing, and/or as developed after the time of filing. As a specific example, for content indicating a tax refund and amount, the user historical context data could include data indicating the user's historical refund amounts.

As discussed below, in various embodiments, the user historical context data is used to determine the emotional impact, and/or appropriateness, of the various content delivery messages represented in the content delivery message data. As also discussed below, in various embodiments, the user historical context data provides personalized background information about the user that allows the selection of the appropriate content delivery message.

In various embodiments, the user historical context data is obtained from any one of various sources including, but not limited to: user data previously obtained by the interactive software systems of PROVIDE AN INTERACTIVE SOFTWARE SYSTEM OPERATION 203; one or more other software systems, such as any of the software systems discussed herein, and/or as known in the art of time of filing, and/or as developed after the time of filing; one or more websites associated with the user, such as financial institution websites, and/or as obtained through screen scraping or similar technology; the user and data input from the user; and/or any other source of user historical context data as discussed herein, and/or as known in the art at the time of filing, and/or as developed after the time of filing.

In one embodiment, the user profile data of OBTAIN USER PROFILE DATA ASSOCIATED WITH A USER OPERATION 213 includes user feedback and emotional profile data. Herein, the term "user feedback and emotional profile data" includes, but is not limited to, any data received from the user representing the feedback and/or relevant data about the user indicating the sensitivities of the individual user and/or the user's culture/society as discussed herein, and/or as known in the art at the time of filing, and/or as developed after the time of filing.

As a specific example, in various embodiments, user feedback and emotional profile data can include, but is not limited to: data received from the user regarding the appropriateness of previously provided content delivery messages and/or user experience components; data indicating the user's marital status, and/or changes in the user's marital status; the number of user dependents, and/or changes in the number of user dependents; the user's employment/employment status; and/or changes in the user's employment/employment status; the heritage/culture, and/or geographic background, of the user; data indicating accepted norms and respectful interaction protocols associated with the heritage/culture, and/or geographic background, of the user; the current geographic location of the user, and/or changes in the geographic location of the user; data indicating accepted norms and respectful interaction protocol associated with the current geographic location of the user; and/or any other data indicating the sensitivities of the individual user and/or the user's culture/society as discussed herein, and/or as known in the art at the time of filing, and/or as developed after the time of filing.

In various embodiments, the user feedback and emotional profile data is obtained from any one of various sources including, but not limited to: user data previously obtained by the interactive software system of PROVIDE AN INTERACTIVE SOFTWARE SYSTEM OPERATION 203; one or more other software systems, such as any of the software system discussed herein, and/or as known in the art of time of filing, and/or as developed after the time of filing; one or more websites associated with the user, such as financial institution websites, and/or as obtained through screen scraping or similar technology; the user and data input from the user; and/or any other source of user historical context data as discussed herein, and/or as known in the art at the time of filing, and/or as developed after the time of filing.

In one embodiment, the user feedback and emotional profile data of OBTAIN USER PROFILE DATA ASSOCIATED WITH A USER OPERATION 213 includes emotional state data.

As used herein, the term "emotional state data" refers to a quantitative representation of a predicted emotional state and/or combination of emotional states and/or physiological, behavioral, and/or experiential indications of an emotional state and/or a combination of emotional states.

In one embodiment, the emotional state data is representative of one or more of the following emotional states: a tense emotional state; a nervous emotional state; a stressed emotional state; an upset emotional state; a frustrated emotional state; a sad emotional state; a depressed emotional state; a bored emotional state; a fatigued emotional state; an alert emotional state; an excited emotional state; an elated emotional state; a happy emotional state; a contented emotional state; a serene emotional state; a relaxed emotional state; and/or a calm emotional state.

In various embodiments, the emotional state data includes, but is not limited to, data acquired from the user's own characterization of his or her emotional state; data acquired from historical user data; data acquired from a segment of users having characteristics comparable to the user; data acquired from measuring a user's heart beat; data acquired from measuring a user's eye rotation; data acquired from measuring a user's perspiration; data acquired from measuring a user's respiration; data acquired from measuring a user's oxygen saturation; data acquired from measuring a user's blood pressure; data acquired from measuring a user's skin temperature; data acquired from measuring a user's muscle tension; data acquired from measuring a user's neural activity; data acquired from measuring a user's eye blinking; data acquired from measuring one or more of a user's facial expressions; data acquired from measuring a user's voice and/or speech; and/or data acquired from measuring a user's interaction with hardware associated with the interactive software system.

In one embodiment, the emotional state data is data acquired from the user's own characterization of his or her emotional state. For example, in one embodiment, the user is presented with a pop-up requesting information about the user's emotional state. Then, in one embodiment, the emotional state data is the data provided by the user via the pop-up. In one embodiment, the emotional state data is data associated with the user's attempts to seek assistance resources via the interactive software system.

In one embodiment, the emotional state data is determined based on the user historical context data, that is, data associated with the user's previous interactions with the interactive software system. For example, in one embodiment, if a user of a financial management service associated with an interactive software system requests information about his or her restaurant budget to determine whether it is feasible to eat out that evening, the financial management service relies on historical user data to estimate the amount of money the user spends when eating out. Then, in one embodiment, if the user does not have enough money in his or her budget to eat out, the financial management service associated with an interactive software system predicts the emotional state of the user and selects the content delivery message and/or user experience components to tailor the user experience accordingly.

In one embodiment, the emotional state data is data associated with a segment of users having characteristics comparable to the user. For example, in one embodiment, if a user of a financial management service associated with an interactive software system requests information about his or her entertainment budget to determine whether it is feasible to go to the movies that evening, the financial management service relies on data associated with a segment of users having characteristics comparable to the user to estimate the amount of money the user will spend when going to the movies. Then, in one embodiment, if the user does not have enough money in his or her budget to go to the movies, the financial management service associated with an interactive software system predicts the emotional state of the user and selects user experience components to tailor the user experience accordingly.

In various embodiments, emotional state monitoring systems are used to collect the user emotional state data including, but not limited to, one or more of the following: a heart rate monitor associated with an interactive software system, an eye tracker associated with an interactive software system; an emotional state monitoring system associated with an interactive software system to measure a user's skin conductance level; an emotional state monitoring system associated with an interactive software system to measure a user's respiration rate; an emotional state monitoring system associated with an interactive software system to measure a user's oxygen saturation level; an emotional state monitoring system associated with an interactive software system to measure a user's blood pressure level; an emotional state monitoring system associated with an interactive software system to measure a user's skin temperature; an emotional state monitoring system associated with an interactive software system to measure a user's muscle tension level; an emotional state monitoring system associated with an interactive software system to measure a user's neural activity; an emotional state monitoring system associated with an interactive software system to measure a user's eye blink rate; an emotional state monitoring system associated with an interactive software system to measure a user's facial muscle movement; an emotional state monitoring system associated with an interactive software system to measure a user's acoustic characteristics; and/or an emotional state monitoring system associated with an interactive software system to measure a user's interaction with hardware associated with an interactive software system.

In various embodiments, the emotional state monitoring systems include any emotional state monitoring system as described herein, as known in the art at the time of filing, and/or as developed after filing.

In one embodiment, once user profile data associated with a user is obtained at OBTAIN USER PROFILE DATA ASSOCIATED WITH A USER OPERATION 213, process flow proceeds to OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215.

In one embodiment, at OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215, current content data representing current content to be provided to the user through the interactive software system is accessed.

In one embodiment, at OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215 current content data that is going to be delivered to the user through the interactive software system of PROVIDE AN INTERACTIVE SOFTWARE SYSTEM OPERATION 203 is accessed before the current content is provided to the user.

In one embodiment, once current content data representing current content to be provided to the user through the interactive software system is accessed at OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215, process flow proceeds to IDENTIFY THE CONTENT TYPE ASSOCIATED WITH THE CURRENT CONTENT DATA OPERATION 217.

In one embodiment, at IDENTIFY THE CONTENT TYPE ASSOCIATED WITH THE CURRENT CONTENT DATA OPERATION 217 the current content data accessed at OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215 is scanned to determine the content type of IDENTIFY ONE OR MORE CONTENT TYPES TO POTENTIALLY BE PROVIDED TO A USER THROUGH THE INTERACTIVE SOFTWARE SYSTEM OPERATION 205 associated with the current content data.

In one embodiment, once the current content data is scanned to determine the content type associated with the current content data at IDENTIFY THE CONTENT TYPE ASSOCIATED WITH THE CURRENT CONTENT DATA OPERATION 217, process flow proceeds to PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219.

In one embodiment, at PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219, one or more emotional effect prediction analytics modules are provided implementing one or more emotional effect prediction algorithms.

In one embodiment, the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219 implement one or more emotional effect prediction algorithms that are used to predict an emotional effect on the user of the current content represented by the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215 based on analysis of the user profile data of OBTAIN USER PROFILE DATA ASSOCIATED WITH A USER OPERATION 213 and the current content data.

In one embodiment, the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219 are "pluggable," e.g., interchangeable, emotional effect prediction analytics modules to be used with one or more interactive software systems that can be selected, interfaced with, and interchanged, without requiring the redeployment of either the interactive software system or any individual analytics module. In this way, different types of user profile data and current content data can be analyzed and utilized by a single interactive software system or version, or multiple interactive software systems and/or versions, and different analytic algorithms can be interchangeably deployed.

In one embodiment, once one or more emotional effect prediction analytics modules are provided implementing one or more emotional effect prediction algorithms at PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219, process flow proceeds to PROVIDE THE ONE OR MORE EMOTIONAL EFFECT PREDICTION ANALYTICS MODULES ACCESS TO THE CURRENT CONTENT DATA AND THE USER PROFILE DATA OPERATION 221.

In one embodiment, at PROVIDE THE ONE OR MORE EMOTIONAL EFFECT PREDICTION ANALYTICS MODULES ACCESS TO THE CURRENT CONTENT DATA AND THE USER PROFILE DATA OPERATION 221, the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219 are provided access to the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215 and the user profile data of OBTAIN USER PROFILE DATA ASSOCIATED WITH A USER OPERATION 213.

In one embodiment, once the one or more emotional effect prediction analytics modules of are provided access to the current content data and the user profile data at PROVIDE THE ONE OR MORE EMOTIONAL EFFECT PREDICTION ANALYTICS MODULES ACCESS TO THE CURRENT CONTENT DATA AND THE USER PROFILE DATA OPERATION 221, process flow proceeds to ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 223.

In one embodiment, at ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 223 the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 219 analyze the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215 and the user profile data of OBTAIN USER PROFILE DATA ASSOCIATED WITH A USER OPERATION 213 to predict an emotional effect on the user of the current content represented by the current content data.

In one embodiment, once the one or more emotional effect prediction analytics modules analyze the current content data and the user profile data to predict an emotional effect on the user of the current content represented by the current content data at ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 223, process flow proceeds to GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225.

In one embodiment, at GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225, as a result of the analysis of the current content data and the user profile data at ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 223, predicted emotional effect data is generated indicating the predicted emotional effect on the user of the current content represented by the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215.

In one embodiment, once predicted emotional effect data is generated indicating the predicted emotional effect on the user of the current content represented by the current content data at GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225, process flow proceeds to SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227.

In one embodiment, at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227, based, at least in part, on the identified content type associated with the current content data of IDENTIFY THE CONTENT TYPE ASSOCIATED WITH THE CURRENT CONTENT DATA OPERATION 217 and the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225, an appropriate one of the one or more content display messages of DEFINE ONE OR MORE CONTENT DELIVERY MESSAGES FOR EACH IDENTIFIED CONTENT TYPE TO POTENTIALLY BE PROVIDED TO A USER THROUGH THE INTERACTIVE SOFTWARE SYSTEM OPERATION 207 for the identified content type associated with the current content data is selected.

In one embodiment, at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227, based, at least in part, on the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225, content delivery messages are selected to be presented in a specific order.

For example, in one embodiment, at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227, if the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225 is determined to be negative, a content delivery message will be selected to provide the user with a user experience that avoids any difficult/unpleasant questions and/or suggestions.

According to one embodiment, a content delivery message is selected at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 to provide the user with an alert; insert human resource assistance; and/or any other form of user assistance when the user is, for example, in a nervous, frustrated, stressed, and/or upset emotional state. If the user is in, for example, a nervous, frustrated, stressed, and/or upset emotional state, a content delivery message is selected at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 to provide an alert to the user for a customer service professional and/or for a system administrator, according to one embodiment.

Furthermore, in various embodiments, the selection of a content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 depends, at least in part, on whether the user is the end customer or a human service provider for the customer. For example, if the user is an accountant interacting with the interactive software system based on the accountant's client's behalf, the appropriate content delivery message may be selected to adapt the user experience to the user's status as a human service provider.

In various embodiments, the experience level of the user is taken into consideration when selecting a content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227. For example, in a tax preparation application, if the user is an accountant, it may be assumed that the user has a higher level of proficiency in tax preparation than that of a non-accountant user. As a result, if at GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 225 a negative effect is predicted, this effect may not be considered to be as important to an accountant user as opposed to an end customer user. Therefore, in one embodiment, a content delivery message selected at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 for an accountant user is different than those selected for a non-accountant, or end customer user.

Thus, at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227, the interactive software system can adapt to the user's profession and/or level of experience when selecting a content delivery message. In one embodiment, if the user is an accountant, the interactive software system may assume that the user has certain knowledge and/or a preferred approach for specific tasks than users who are not accountants. Based on this assumption, a content delivery message may then be selected at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 to provide an appropriate user experience.

As one example, an interactive software system that provides accounting services for small businesses may select a content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 based on whether there are a significant number of overdue invoices or whether the business's overall cash flow has been negative for some length of time. Additionally, because an accountant user may be less emotionally involved in overdue invoices or negative cash flow than the small business owner for whom the accountant is providing services, the content delivery message selected at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 for an accountant user may differ than those selected for an owner user.

Similarly, an interactive software system that provides financial management services may, in one embodiment, consider the net worth of the user when selecting a content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227. If the user's net worth has been steadily increasing over some period of time and the user has been consistently interacting with the interactive software system in a happy emotional state, the interactive software system may select a content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 to suggest that the user contribute the maximum amount of money possible to his or her 401K, put money into an IRA, and take an expensive vacation.

By selecting an appropriate content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 to present a customized user experience to a user, the present disclosure allows for significant improvement to the technical fields of user experience, customer service, data collection, and data processing. Indeed, by minimizing and potentially eliminating the presentation of an irrelevant user experience to a user, embodiments of the present disclosure use fewer human resources like time and energy by not selecting an irrelevant or even frustrating a content delivery message. Similarly, by selecting an appropriate content delivery message at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227 to provide a customized user experience, embodiments of the present disclosure actually improve the efficiency of the user experience by presenting a user experience that makes a user's interaction with an interactive software system easier and less stressful.

Furthermore, by allowing for more relevant interactions between a user and an interactive software system, embodiments of the present disclosure require fewer processing cycles and less communications bandwidth. As a result, embodiments of the present disclosure allow for improved processor performance, more efficient use of memory access and data storage capabilities, reduced communication channel bandwidth utilization, faster communications connections, and improved user efficiency. Consequently, computing and software systems are transformed into faster and more operationally efficient devices and systems by implementing and/or providing the embodiments of the present disclosure. Therefore, implementation of embodiments of the present disclosure amounts to significantly more than an abstract idea and also provides several improvements to multiple technical fields.

In one embodiment, once, based at least in part, on the identified content type associated with the current content data and the predicted emotional effect on the user of the current content, an appropriate one of the one or more content display messages for the identified content type associated with the current content data is selected at SELECT AN APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 227, process flow proceeds to PROVIDE THE USER WITH THE SELECTED APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 229.

In one embodiment, at PROVIDE THE USER WITH THE SELECTED APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 229, the user is provided with a portion of the content display message data of GENERATE CONTENT DISPLAY MESSAGE DATA REPRESENTING EACH OF THE CONTENT DISPLAY MESSAGES OPERATION 209 representing the selected appropriate one of the one or more content display messages of SELECT AN APPROPRIATE ONE OF THE ONE OR MORE CONTENT DISPLAY MESSAGES FOR THE IDENTIFIED CONTENT TYPE ASSOCIATED WITH THE CURRENT CONTENT DATA OPERATION 227 for the identified content type associated with the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 215.

In one embodiment, once the user is provided with a portion of the content display message data representing the selected appropriate one of the one or more content display messages for the identified content type associated with the current content data at PROVIDE THE USER WITH THE SELECTED APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 229, the user is provided the opportunity to provide user feedback data regarding the appropriateness, and/or level of respect, associated with the content display message provided. In one embodiment, this user feedback data is then incorporated and used to modify the user profile data of OBTAIN USER PROFILE DATA ASSOCIATED WITH A USER OPERATION 213 so that subsequent content display messages are appropriate.

In one embodiment, in order to tailor and/or evolve the written wording or the verbal intonation or the three-dimension visual interactions of the content of the content delivery messages more effectively, A/B tests are conducted in samples of users. In one embodiment this testing is automatically conducted by asking whether a given user wants to participate or not, i.e., the users can opt-in.

In these embodiments, the process of selecting the appropriate content delivery message can automatically adjust over time and be constantly adapting. Thus the appropriate content delivery message can evolve over time, even when the underlying logic of the interactive software system does not change, as language expressions change over time and as verbal or visual communication patterns change over time. Thus, the interactive software system can adapt to changing social patterns and behaviors.

The appropriate content delivery message can further be tailored by using the user affinities, so for a user that is a fan of basketball an appropriate content delivery message can be generated and selected using basketball analogies and/or basketball-oriented language. This analysis can be used for all sports, or activities, or vocations.

In one embodiment, once the user is provided with a portion of the content display message data representing the selected appropriate one of the one or more content display messages for the identified content type associated with the current content data at PROVIDE THE USER WITH THE SELECTED APPROPRIATE ONE OF THE ONE OR MORE CONTENT DELIVERY MESSAGES FOR THE IDENTIFIED CONTENT TYPE ASSOCIATED WITH THE CURRENT CONTENT DATA OPERATION 229, process flow proceeds to EXIT OPERATION 230.

In one embodiment, at EXIT OPERATION 230, process 200 for adapting a user experience provided through an interactive software system to the content being delivered and the predicted emotional impact on the user of that content is exited to await new data.

In one embodiment, a process for adapting a user experience provided through an interactive software system to the content being delivered and the predicted emotional impact on the user of that content includes providing an interactive software system through which a content delivery message and user experience components are to be provided to a user of the interactive software system.

In one embodiment, one or more user experience components are defined that are capable of combination to provide a user experience through the interactive software system and user experience component data representing the defined one or more user experience components is generated and stored.

In one embodiment, user profile data associated with a user is obtained, including, but not limited to, user historical context data and/or user feedback and emotional profile data. In one embodiment, current content data representing current content to be provided to the user through the interactive software system is accessed and the content type associated with the current content data is determined.

In one embodiment, one or more emotional effect prediction analytics modules are provided implementing one or more emotional effect prediction algorithms and the one or more emotional effect prediction analytics modules are provided access to the current content data and the user profile data. In one embodiment, the current content data and the user profile data are analyzed by the one or more emotional effect prediction algorithms of the one or more emotional effect prediction analytics modules to predict an emotional effect on the user of the current content represented by the current content data.

In one embodiment, as a result of the analysis of the current content data and the user profile data, predicted emotional effect data is generated indicating the predicted emotional effect on the user of the current content represented by the current content data.

In one embodiment, based, at least in part, on the predicted emotional effect on the user of the current content, a portion of the user experience component data is selected representing one or more selected user experience components of the defined one or more user experience components and the one or more selected user experience components are used to transform a user experience provided through the interactive software system into a user experience adapted to the predicted emotional effect on the user of the current content. In one embodiment, the user is provided with the user experience adapted to the predicted emotional effect on the user of the current content.

Figure 3:
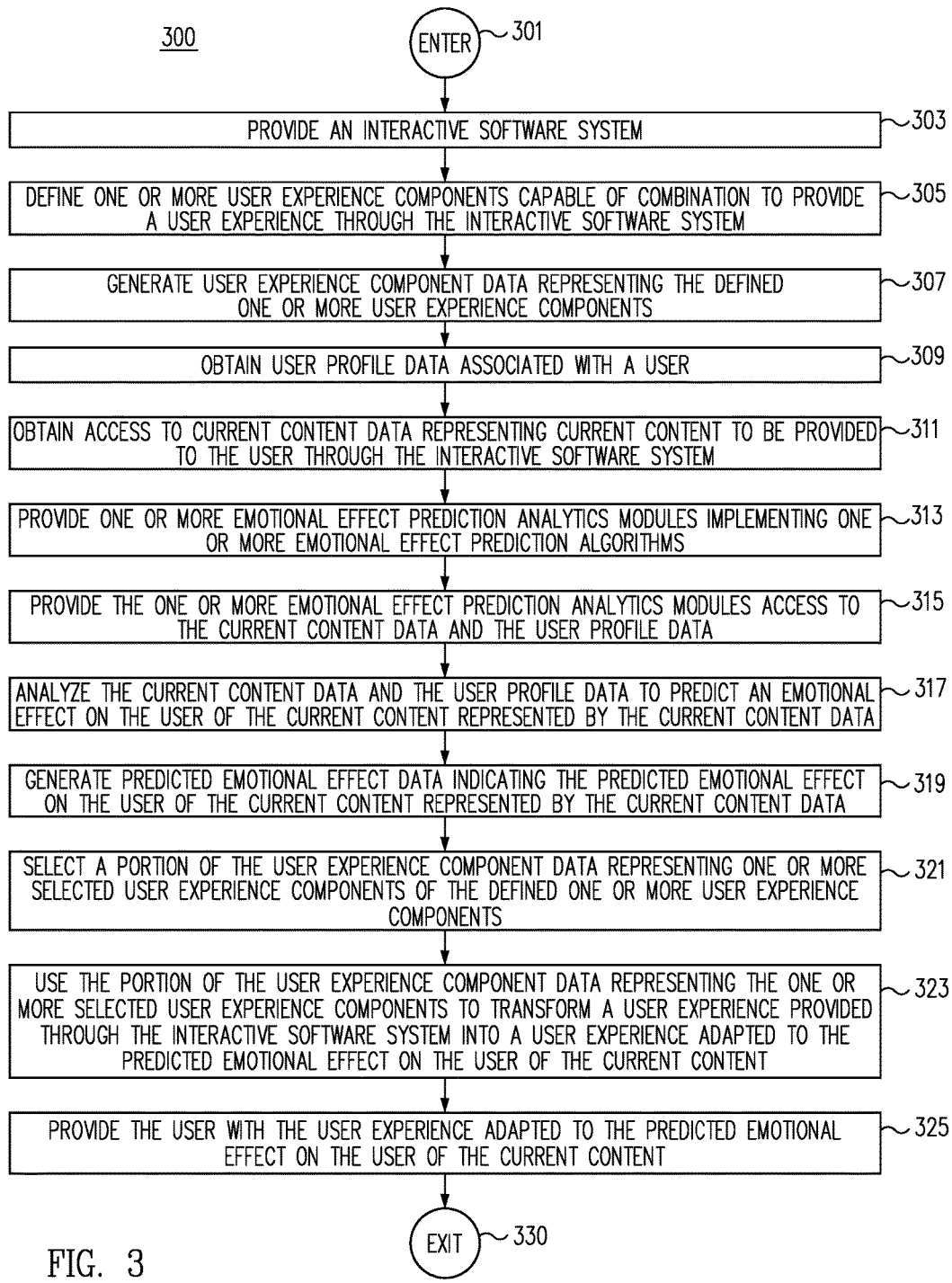
FIG. 3 is a flow diagram for adapting a user experience provided through an interactive software system to the content being delivered and the predicted emotional impact on the user of that content in accordance with one embodiment.

FIG. 3 is a flow chart representing one example of a process 300 for adapting a user experience provided through an interactive software system to the content being delivered and the predicted emotional impact on the user of that content in accordance with one embodiment.

As seen in FIG. 3, in one embodiment, process 300 for adapting a user experience provided through an interactive software system to the content being delivered and the predicted emotional impact on the user of that content begins at ENTER OPERATION 301 and process flow proceeds to PROVIDE AN INTERACTIVE SOFTWARE SYSTEM OPERATION 303.

In one embodiment, at PROVIDE AN INTERACTIVE SOFTWARE SYSTEM OPERATION 303, an interactive software system is provided through which a content delivery message and user experience components are to be provided to a user of the interactive software system.

In various embodiments, the interactive software system of PROVIDE AN INTERACTIVE SOFTWARE SYSTEM OPERATION 303 is any interactive software system as discussed herein above with respect to process 200 for adapting a user experience provided through an interactive software system to the content being delivered and the predicted emotional impact on the user of that content, as known in the art at the time of filing, and/or as developed after the time of filing.

In one embodiment, once an interactive software system is provided for use by one or more users at PROVIDE AN INTERACTIVE SOFTWARE SYSTEM OPERATION 303, process flow proceeds to DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305.

In one embodiment, at DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305, user experience components that can be used and/or combined to create a user experience that will be provided through the interactive software system of PROVIDE AN INTERACTIVE SOFTWARE SYSTEM OPERATION 303 are identified.

As discussed herein, a user experience of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305 includes the practical, experiential, affective, significant, and/or valuable aspects of human/software interaction.

In one embodiment, the user experience components of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305 include the various elements that make up a user experience. In various embodiments, the user experience components of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305 include, but are not limited to, individualized user interview questions and question sequences, user interfaces, interface displays, sub-displays, images, side bar displays, pop-up displays, alarms, music, backgrounds, avatars, highlighting mechanisms, icons, assistance resources, user recommendations, supplemental actions and recommendations, and/or any other components that individually, or in combination, create a user experience, as discussed herein, and/or as known in the art at the time of filing, and/or as developed after the time of filing.

In one embodiment, once one or more user experience components are defined that are capable of combination to provide a user experience through the interactive software system at DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305, process flow proceeds to GENERATE USER EXPERIENCE COMPONENT DATA REPRESENTING THE DEFINED ONE OR MORE USER EXPERIENCE COMPONENTS OPERATION 307.

In one embodiment, at GENERATE USER EXPERIENCE COMPONENT DATA REPRESENTING THE DEFINED ONE OR MORE USER EXPERIENCE COMPONENTS OPERATION 307, user experience component data representing the defined one or more user experience components of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305 is generated and stored.

In one embodiment, once user experience component data representing the defined one or more user experience components of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305 is generated and stored at GENERATE USER EXPERIENCE COMPONENT DATA REPRESENTING THE DEFINED ONE OR MORE USER EXPERIENCE COMPONENTS OPERATION 307, process flow proceeds to OBTAIN USER PROFILE DATA ASSOCIATED WITH A USER OPERATION 309.

In one embodiment, at OBTAIN USER PROFILE DATA ASSOCIATED WITH A USER OPERATION 309, user profile data associated with a user is obtained, including, but not limited to user historical context data and/or user feedback and emotional profile data.

In various embodiments, the user profile data associated with a user obtained at OBTAIN USER PROFILE DATA ASSOCIATED WITH A USER OPERATION 309 is any of the user profile data discussed above with respect to OBTAIN USER PROFILE DATA ASSOCIATED WITH A USER OPERATION 213 of process 200 for adapting a user experience provided through an interactive software system to the content being delivered and the predicted emotional impact on the user of that content, as known in the art at the time of filing, and/or as developed after the time of filing.

In one embodiment, once user profile data associated with a user is obtained, including, but not limited to user historical context data and/or user feedback and emotional profile data at OBTAIN USER PROFILE DATA ASSOCIATED WITH A USER OPERATION 309, process flow proceeds to OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311.

In one embodiment, at OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311, current content data representing current content to be provided to the user through the interactive software system of PROVIDE AN INTERACTIVE SOFTWARE SYSTEM OPERATION 303 is accessed and the content type associated with the current content data is determined.

In one embodiment, at OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311 current content data that is going to be delivered to the user through the interactive software system of PROVIDE AN INTERACTIVE SOFTWARE SYSTEM OPERATION 303 is accessed before the current content is provided to the user.

In one embodiment, once current content data representing current content to be provided to the user through the interactive software system is accessed OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311, process flow proceeds to PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313.

In one embodiment, at PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313, one or more emotional effect prediction analytics modules are provided implementing one or more emotional effect prediction algorithms.

In one embodiment, the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313 implement one or more emotional effect prediction algorithms that are used to predict an emotional effect on the user of the current content represented by the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311 based on analysis of the user profile data of OBTAIN USER PROFILE DATA ASSOCIATED WITH A USER OPERATION 309 and the current content data.

In one embodiment, the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313 are "pluggable," e.g., interchangeable, emotional effect prediction analytics modules to be used with one or more interactive software systems that can be selected, interfaced with, and interchanged, without requiring the redeployment of either the interactive software system or any individual analytics module. In this way, different types of user profile data and current content data can be analyzed and utilized by a single interactive software system or version, or multiple interactive software systems and/or versions, and different analytic algorithms can be interchangeably deployed.

In one embodiment, once one or more emotional effect prediction analytics modules are provided implementing one or more emotional effect prediction algorithms at PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313, process flow proceeds to PROVIDE THE ONE OR MORE EMOTIONAL EFFECT PREDICTION ANALYTICS MODULES ACCESS TO THE CURRENT CONTENT DATA AND THE USER PROFILE DATA OPERATION 315.

In one embodiment, at PROVIDE THE ONE OR MORE EMOTIONAL EFFECT PREDICTION ANALYTICS MODULES ACCESS TO THE CURRENT CONTENT DATA AND THE USER PROFILE DATA OPERATION 315, the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313 are provided access to the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311 and the user profile data of OBTAIN USER PROFILE DATA ASSOCIATED WITH A USER OPERATION 309.

In one embodiment, once the one or more emotional effect prediction analytics modules of are provided access to the current content data and the user profile data at PROVIDE THE ONE OR MORE EMOTIONAL EFFECT PREDICTION ANALYTICS MODULES ACCESS TO THE CURRENT CONTENT DATA AND THE USER PROFILE DATA OPERATION 315, process flow proceeds to ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 317.

In one embodiment, at ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 317 the one or more emotional effect prediction analytics modules of PROVIDE ONE OR MORE EMOTIONAL EFFECT PREDICTION ANALYTICS MODULES IMPLEMENTING ONE OR MORE EMOTIONAL EFFECT PREDICTION ALGORITHMS OPERATION 313 analyze the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311 and the user profile data of OBTAIN USER PROFILE DATA ASSOCIATED WITH A USER OPERATION 309 to predict an emotional effect on the user of the current content represented by the current content data.

In one embodiment, once the one or more emotional effect prediction analytics modules analyze the current content data and the user profile data to predict an emotional effect on the user of the current content represented by the current content data at ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 317, process flow proceeds to GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319.

In one embodiment, at GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319, as a result of the analysis of the current content data and the user profile data at ANALYZE THE CURRENT CONTENT DATA AND THE USER PROFILE DATA TO PREDICT AN EMOTIONAL EFFECT ON THE USER OF THE CURRENT CONTENT REPRESENTED BY THE CURRENT CONTENT DATA OPERATION 317, predicted emotional effect data is generated indicating the predicted emotional effect on the user of the current content represented by the current content data of OBTAIN ACCESS TO CURRENT CONTENT DATA REPRESENTING CURRENT CONTENT TO BE PROVIDED TO THE USER THROUGH THE INTERACTIVE SOFTWARE SYSTEM OPERATION 311.

In one embodiment, once predicted emotional effect data is generated indicating the predicted emotional effect on the user of the current content represented by the current content data at GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319, process flow proceeds to SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321.

In one embodiment, at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321, based, at least in part, on the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319, a portion of the user experience component data is selected representing one or more selected user experience components of the defined one or more user experience components of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305.

In one embodiment, at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321, based, at least in part, on the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319 user experience components are selected that are predicted to maintain, or improve, the emotional state of a user during and after the user's interaction with the interactive software system.

As a specific example, in a tax preparation service provided by an interactive software system, if an upcoming tax topic will require several questions and interactions to complete, a user experience component or combination of user experience components is selected at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 depending on the predicted emotional effect on the user of the current content.

As an example, in one embodiment, if the predicted emotional effect on the user of the current content is positive, a user experience component or combination of user experience components is selected to reflect this predicted emotional effect and provide a neutral or "matter of fact" user experience. As another example, in one embodiment, if the predicted emotional effect on the user of the current content is negative, a user experience component or combination of user experience components is selected to reflect this predicted emotional effect and provide a gentler and more upbeat user experience, such as providing the user with soothing background colors and/or music as part of the user experience.

In one embodiment, at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321, based, at least in part, on the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319 user experience components are selected that provide the user with a user experience that presents any content display messages, questions and/or suggestions in a specific order.

For example, in one embodiment, at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321, if the predicted emotional effect on the user of the current content of GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319 is determined to be negative, a user experience component or combination of user experience components will be selected to provide the user with a user experience that avoids any difficult/unpleasant questions and/or suggestions.

According to one embodiment, a user experience component or combination of user experience components is selected at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 to provide the user with an alert; insert human resource assistance; and/or any other form of user assistance when the user is, or is predicted to be, in a nervous, frustrated, stressed, and/or upset emotional state. If the user is, or is predicted to be, in a nervous, frustrated, stressed, and/or upset emotional state, a user experience component or combination of user experience components is selected at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 to provide an alert to the user for a customer service professional and/or for a system administrator, according to one embodiment.

Furthermore, in various embodiments, the selection of a user experience component or combination of user experience components at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 depends at least in part on whether the user is the end customer or a human service provider for the customer. For example, if the user is an accountant interacting with the interactive software system based on the accountant's client's behalf, the appropriate user experience components may be selected to adapt the user experience to the user's status as a human service provider.

In various embodiments, the experience level of the user is taken into consideration when selecting a user experience component or combination of user experience components at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321. For example, in a tax preparation application, if the user is an accountant, it may be assumed that the user has a higher level of proficiency in tax preparation than that of a non-accountant user. As a result, if at GENERATE PREDICTED EMOTIONAL EFFECT DATA INDICATING THE PREDICTED EMOTIONAL EFFECT ON THE USER OF THE CURRENT CONTENT REPRESENTED BY THE CURRENT CONTENT DATA OPERATION 319 a negative effect is predicted, this effect may not be considered to be as important to an accountant user as opposed to an end customer user. Therefore, in one embodiment, a user experience component or combination of user experience components selected at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 for an accountant user is different than those selected for a non-accountant, or end customer user.

Thus, at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321, the interactive software system can adapt to the user's profession and/or level of experience when selecting a user experience component or combination of user experience components. In one embodiment, if the user is an accountant, the interactive software system may assume that the user has certain knowledge and/or a preferred approach for specific tasks than users who are not accountants. Based on this assumption, a user experience component or combination of user experience components may then be selected at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 to provide an appropriate user experience.

As one example, an interactive software system that provides accounting services for small businesses may select a user experience component or combination of user experience components at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 based on whether there are a significant number of overdue invoices or whether the business's overall cash flow has been negative for some length of time. Additionally, because an accountant user may be less emotionally involved in overdue invoices or negative cash flow than the small business owner for whom the accountant is providing services, the user experience component or combination of user experience components selected at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 for an accountant user may differ than those selected for an owner user.

By selecting an appropriate user experience component or combination of user experience components at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 to present a customized user experience to a user, the present disclosure allows for significant improvement to the technical fields of user experience, customer service, data collection, and data processing. Indeed, by minimizing and potentially eliminating the presentation of an irrelevant user experience to a user, embodiments of the present disclosure use fewer human resources like time and energy by not selecting an irrelevant or even frustrating a user experience component or combination of user experience components.

Similarly, by selecting an appropriate user experience component or combination of user experience components at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 to provide a customized user experience, embodiments of the present disclosure actually improve the efficiency of the user experience by presenting a user experience that makes a user's interaction with an interactive software system easier and less stressful.

Furthermore, by allowing for more relevant interactions between a user and an interactive software system, embodiments of the present disclosure require fewer processing cycles and less communications bandwidth. As a result, embodiments of the present disclosure allow for improved processor performance, more efficient use of memory access and data storage capabilities, reduced communication channel bandwidth utilization, faster communications connections, and improved user efficiency. Consequently, computing and software systems are transformed into faster and more operationally efficient devices and systems by implementing and/or providing the embodiments of the present disclosure. Therefore, implementation of embodiments of the present disclosure amounts to significantly more than an abstract idea and also provides several improvements to multiple technical fields.

In one embodiment, once, based at least in part, on the predicted emotional effect on the user of the current content, a portion of the user experience component data is selected representing one or more selected user experience components of the defined one or more user experience components of DEFINE ONE OR MORE USER EXPERIENCE COMPONENTS CAPABLE OF COMBINATION TO PROVIDE A USER EXPERIENCE THROUGH THE INTERACTIVE SOFTWARE SYSTEM OPERATION 305 at SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321, process flow proceeds to USE THE PORTION OF THE USER EXPERIENCE COMPONENT DATA REPRESENTING THE ONE OR MORE SELECTED USER EXPERIENCE COMPONENTS TO TRANSFORM A USER EXPERIENCE PROVIDED THROUGH THE INTERACTIVE SOFTWARE SYSTEM INTO A USER EXPERIENCE ADAPTED TO THE PREDICTED EMOTIONAL EFFECT ON THE USER OF THE CURRENT CONTENT OPERATION 323.

In one embodiment, at USE THE PORTION OF THE USER EXPERIENCE COMPONENT DATA REPRESENTING THE ONE OR MORE SELECTED USER EXPERIENCE COMPONENTS TO TRANSFORM A USER EXPERIENCE PROVIDED THROUGH THE INTERACTIVE SOFTWARE SYSTEM INTO A USER EXPERIENCE ADAPTED TO THE PREDICTED EMOTIONAL EFFECT ON THE USER OF THE CURRENT CONTENT OPERATION 323, the one or more selected user experience components of SELECT A PORTION OF THE USER EXPERIENCE COMPONENT DATA REPRESENTING ONE OR MORE SELECTED USER EXPERIENCE COMPONENTS OF THE DEFINED ONE OR MORE USER EXPERIENCE COMPONENTS OPERATION 321 are used to transform a user experience provided through the interactive software system of PROVIDE AN INTERACTIVE SOFTWARE SYSTEM OPERATION 303 into a user experience adapted to the predicted emotional effect on the user of the current content.

In one embodiment, once the one or more selected user experience components are used to transform a user experience provided through the interactive software system into a user experience adapted to the predicted emotional effect on the user of the current content at USE THE PORTION OF THE USER EXPERIENCE COMPONENT DATA REPRESENTING THE ONE OR MORE SELECTED USER EXPERIENCE COMPONENTS TO TRANSFORM A USER EXPERIENCE PROVIDED THROUGH THE INTERACTIVE SOFTWARE SYSTEM INTO A USER EXPERIENCE ADAPTED TO THE PREDICTED EMOTIONAL EFFECT ON THE USER OF THE CURRENT CONTENT OPERATION 323, process flow proceeds to PROVIDE THE USER WITH THE USER EXPERIENCE ADAPTED TO THE PREDICTED EMOTIONAL EFFECT ON THE USER OF THE CURRENT CONTENT OPERATION 325.

In one embodiment, at PROVIDE THE USER WITH THE USER EXPERIENCE ADAPTED TO THE PREDICTED EMOTIONAL EFFECT ON THE USER OF THE CURRENT CONTENT OPERATION 325, the user is provided with the user experience adapted to the predicted emotional effect on the user of the current content of USE THE PORTION OF THE USER EXPERIENCE COMPONENT DATA REPRESENTING THE ONE OR MORE SELECTED USER EXPERIENCE COMPONENTS TO TRANSFORM A USER EXPERIENCE PROVIDED THROUGH THE INTERACTIVE SOFTWARE SYSTEM INTO A USER EXPERIENCE ADAPTED TO THE PREDICTED EMOTIONAL EFFECT ON THE USER OF THE CURRENT CONTENT OPERATION 323.

In one embodiment, at PROVIDE THE USER WITH THE USER EXPERIENCE ADAPTED TO THE PREDICTED EMOTIONAL EFFECT ON THE USER OF THE CURRENT CONTENT OPERATION 325, the user is provided with the user experience adapted to the predicted emotional effect on the user of the current content on a user computing system, such as any of the computing systems discussed herein, and/or as known in the art at the time of filing, and/or as developed after the time of filing.

In one embodiment, once the user is provided with the user experience adapted to the predicted emotional effect on the user of the current content at PROVIDE THE USER WITH THE USER EXPERIENCE ADAPTED TO THE PREDICTED EMOTIONAL EFFECT ON THE USER OF THE CURRENT CONTENT OPERATION 325, the user is provided the opportunity to provide user feedback data regarding the appropriateness, and/or level of respect, associated with the user experience adapted to the predicted emotional effect on the user of the current content provided. In one embodiment, this user feedback data is then incorporated and used to modify the user profile data of OBTAIN USER PROFILE DATA ASSOCIATED WITH A USER OPERATION 213 so that subsequent user experiences adapted to the predicted emotional effect on the user of the current content are appropriate.

In one embodiment, in order to tailor and/or evolve the written wording or the verbal intonation or the three-dimension visual interactions of the content of the content delivery messages more effectively, A/B tests are conducted in samples of users. In one embodiment this testing is automatically conducted by asking whether a given user wants to participate or not, i.e., the users can opt-in.

In these embodiments, the process of selecting the appropriate user experiences adapted to the predicted emotional effect on the user of the current content can automatically adjust over time and be constantly adapting. Thus the appropriate user experiences adapted to the predicted emotional effect on the user of the current content can evolve over time, even when the underlying logic of the interactive software system does not change, as language expressions change over time and as verbal or visual communication patterns change over time. Thus, the interactive software system can adapt to changing social patterns and behaviors.

In one embodiment, once the user is provided with the user experience adapted to the predicted emotional effect on the user of the current content at PROVIDE THE USER WITH THE USER EXPERIENCE ADAPTED TO THE PREDICTED EMOTIONAL EFFECT ON THE USER OF THE CURRENT CONTENT OPERATION 325, process flow proceeds to EXIT OPERATION 330.

In one embodiment, at EXIT OPERATION 330, process 300 for adapting a user experience provided through an interactive software system to the content being delivered and the predicted emotional impact on the user of that content is exited to await new data.

Implementations of embodiments of processes 200 and 300 for adapting a user experience provided through an interactive software system to the content being delivered and the predicted emotional impact on the user of that content significantly improve the technical fields of software systems, user experience, customer service, data collection, and data processing.

In addition, The various embodiments of the disclosure, and their associated benefits, as discussed herein, improve the technical field of interactive software systems and data processing by using current content data, user historical context data, and user feedback and emotional profile data to predict an emotional effect on the user of content to be provided to the user before that content is provided to the user.

In this way, the content delivery message and user experience components provided can be individualized to the user in an evolving, dynamic, manner that is not only customized to an individual user, but also to the content being delivered, and/or variations in the emotional state of the user, and/or the individual user's sensitivities and the potential emotional effect of the current content being provided to the individual user, and/or the culture/customs associated with the individual user. Consequently, the disclosed embodiments amount to significantly more than an implementation of the abstract idea of customizing a message or user experience to a specific user.

In addition, by individualizing or personalizing the user experience, an interactive software system may be able to provide a more useful service to the user. For example, in one embodiment, an interactive software system providing a tax return preparation service may be able to gather more complete information from the user and provide a more thorough and customized analysis of potential tax return benefits for the user.

In addition, as noted above, by minimizing, or potentially eliminating, the processing and presentation of an inappropriate user experience to a user, implementation of embodiments of the present disclosure allows for significant improvement to the field of data collection and data processing.

As one illustrative example, by minimizing, or potentially eliminating, the processing and presentation of an inappropriate user experience to a user, implementation of embodiments of the present disclosure allows for relevant data collection using fewer processing cycles and less communications bandwidth. Furthermore, when a user is presented with an inappropriate user experience, the user is much more likely to abandon the interactive software system altogether, thereby wasting all the processing cycles and communications bandwidth already invested in the user. Thus, by processing and presenting an appropriate user experience to a user, a user is less likely to abandon the interactive software system.

As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "associating," "aggregating," "collecting," "creating," "comparing," "defining," "determining," "generating," "identifying," "initiating," "obtaining," "providing," "processing," "presenting," "receiving," "storing," "searching," "selecting," "transferring," etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real-time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient and/or efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

As discussed above, using the above embodiments, with little or no modification and/or input, there is considerable flexibility, adaptability, and opportunity for customization to meet the specific needs of various users under numerous circumstances. In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A method for adapting a user experience provided through an interactive software system to the content being delivered and the predicted emotional impact on the user of that content comprising:

providing an interactive software system;

identifying one or more content types to potentially be provided to a user through the interactive software system;

defining one or more content delivery messages for each identified content type to potentially be provided to a user through the interactive software system;

generating content delivery message data representing each of the content delivery messages;

correlating the portion of content delivery message data representing each of the content delivery messages for each content type with the associated content type;

storing the correlated content delivery message data in a partitioned correlated content delivery message data section of a memory system;

defining one or more user experience components, the one or more user experience components capable of combination to provide a user experience through the interactive software system, the defined user experience components including voice tones, frequencies and inflections;

generating user experience component data, the user experience component data representing the defined one or more user experience components;

storing the user experience component data in a partitioned user experience components data section of a memory system;

obtaining user profile data associated with a user;

obtaining access to current content data representing current content to be provided to the user through the interactive software system;

identifying the content type associated with the current content data;

providing one or more emotional effect prediction analytics modules, the one or more emotional effect prediction analytics modules implementing one or more emotional effect prediction algorithms;

providing the one or more emotional effect prediction analytics modules access to the current content data and the user profile data;

analyzing the current content data and the user profile data to predict an emotional effect on the user of the current content represented by the current content data using the one or more emotional effect prediction analytics modules;

generating predicted emotional effect data indicating the predicted emotional effect on the user of the current content represented by the current content data;

based, at least in part, on the predicted emotional effect on the user of the current content, selecting a portion of the user experience component data, the selected portion of the user experience component data representing one or more selected user experience components of the defined one or more user experience components, the selected portion of the user experience component data including particular voice tones, frequencies and inflections;

using the portion of the user experience component data representing the selected user experience components of the defined one or more user experience components to transform a user experience provided through the interactive software system into a user experience adapted to the predicted emotional effect on the user of the current content;

based, at least in part, on the identified content type associated with the current content data and the predicted emotional effect on the user of the current content, selecting an appropriate one of the one or more content delivery messages for the identified content type associated with the current content data; and providing the user with a portion of the content delivery message data representing the selected appropriate one of the one or more content delivery messages for the identified content type associated with the current content data and the user experience adapted to the predicted emotional effect on the user of the current content.

2. The method for adapting a user experience provided through an interactive software system to the content being delivered and the predicted emotional impact on the user of that content of claim 1, wherein the interactive software system is selected from the group of interactive software systems consisting of:
a computing system implemented tax preparation software system;
a network accessed tax preparation software system;
a web-based tax preparation software system;
a cloud-based tax preparation software system;
a computing system implemented business management software system;
a network accessed business management software system;
a web-based business management software system;
a cloud-based business management software system;
a computing system implemented accounting software system;
a network accessed accounting software system;
a web-based accounting software system;
a cloud-based accounting software system;
a computing system implemented financial management system;
a network accessed financial management system;
a web-based financial management system; and
a cloud-based financial management system.

3. The method for adapting a user experience provided through an interactive software system to the content being delivered and the predicted emotional impact on the user of that content of claim 1, wherein the content delivery messages are text based messages.

4. The method for adapting a user experience provided through an interactive software system to the content being delivered and the predicted emotional impact on the user of that content of claim 1, wherein the content delivery messages are audio based messages.

5. The method for adapting a user experience provided through an interactive software system to the content being delivered and the predicted emotional impact on the user of that content of claim 1, wherein the content delivery messages are video based messages.

6. The method for adapting a user experience provided through an interactive software system to the content being delivered and the predicted emotional impact on the user of that content of claim 1, wherein the user experience components include at least one user experience component selected from the group of user experience components consisting of:
a voice used to convey an audio message including the current content to the user;
font sizes used while presenting the current content to the user;
themes presented to the user;
types of icons displayed to the user;
types of interface formats presented to the user;
interface displays presented to the user;
images displayed to the user;
assistance resources listed and/or recommended to the user;
user recommendations presented to the user;
backgrounds presented to the user;
background audio presented to the user;
avatars and/or symbols presented to the user;
highlighting mechanisms used and highlighted components presented to the user;
support mechanisms presented to the user; and
supplemental actions and recommendations presented to the user.

7. The method for adapting a user experience provided through an interactive software system to the content being delivered and the predicted emotional impact on the user of that content of claim 1, wherein the user profile data associated with the user includes user historical context data representing the user's historical data related to the current content represented by the current content data.

8. The method for adapting a user experience provided through an interactive software system to the content being delivered and the predicted emotional impact on the user of that content of claim 1, wherein the user profile data associated with the user includes feedback and profile data representing the feedback and/or historical data from the user indicating the sensitivities of the user.

9. The method for adapting a user experience provided through an interactive software system to the content being delivered and the predicted emotional impact on the user of that content of claim 1, wherein the user profile data associated with the user includes emotional state data associated with a user, the emotional state data being one or more of defined one or more types of emotional state data.

10. The method for adapting a user experience provided through an interactive software system to the content being delivered and the predicted emotional impact on the user of that content of claim 9, wherein the emotional state data includes at least one of the emotional state data selected from the group of emotional state data consisting of:
data acquired from the user's own characterization of his or her emotional state;
data acquired from historical user data;
data acquired from a segment of users having characteristics comparable to the user;
data acquired from measuring the user's heart beat;
data acquired from measuring the user's eye rotation;
data acquired from measuring the user's perspiration;
data acquired from measuring the user's respiration;
data acquired from measuring the user's oxygen saturation;

data acquired from measuring the user's blood pressure
data acquired from measuring the user's skin temperature;
data acquired from measuring the user's muscle tension;
data acquired from measuring the user's neural activity;
data acquired from measuring the user's eye blinking;
data acquired from measuring the user's facial expression;
data acquired from measuring the user's voice and/or speech; and
data acquired from measuring the user's interactions with hardware associated with an interactive software system.

11. The method for adapting a user experience provided through an interactive software system to the content being delivered and the predicted emotional impact on the user of that content of claim 9, wherein an emotional state of the user includes at least one of the emotional states selected from the group of emotional states consisting of:
a happy emotional state or happiness;
a sad emotional state or sadness;
a surprised emotional state or surprise;
a fearful emotional state or fear;
a disgusted emotional state or disgust;
an angry emotional state or anger;
a tense emotional state;
a nervous emotional state;
a stressed emotional state;
an upset emotional state;
a frustrated emotional state;
a depressed emotional state;
a bored emotional state;
a fatigued emotional state;
an alert emotional state;
an excited emotional state;
an elated emotional state;
a happy emotional state;
a contented emotional state;
a serene emotional state;
a relaxed emotional state; and
a calm emotional state.

12. The method for adapting a user experience provided through an interactive software system to the content being delivered and the predicted emotional impact on the user of that content of claim 1, wherein at least one of the one or more emotional effect prediction analytics modules is an interchangeable analytics module.

13. The method for adapting a user experience provided through an interactive software system to the content being delivered and the predicted emotional impact on the user of that content of claim 1, wherein transforming the user experience provided through the interactive software system into a user experience adapted to the predicted emotional effect on the user of the current content includes adding one or more user experience components to the user experience.

14. The method for adapting a user experience provided through an interactive software system to the content being delivered and the predicted emotional impact on the user of that content of claim 1, wherein transforming the user experience provided through the interactive software system into a user experience adapted to the predicted emotional effect on the user of the current content includes removing one or more user experience components from the user experience.

15. The method for adapting a user experience provided through an interactive software system to the content being delivered and the predicted emotional impact on the user of that content of claim 1, wherein the portion of the content delivery message data representing the selected appropriate one of the one or more content delivery messages for the identified content type associated with the current content data and the user experience adapted to the predicted emotional effect on the user of the current content is provided to the user via a user display screen displayed on a user computing system accessible by the user.

16. The method for adapting a user experience provided through an interactive software system to the content being delivered and the predicted emotional impact on the user of that content of claim 15, wherein the user computing system is selected from the group of computing systems consisting of:
a server computing system;
a workstation;
a desktop computing system;
a mobile computing system; and
a wearable computing system.

17. The method for adapting a user experience provided through an interactive software system to the content being delivered and the predicted emotional impact on the user of that content of claim 1, further comprising:
obtaining feedback data from the user regarding whether the user found the selected appropriate content delivery message to be appropriate for the content represented by the current content data; and
using the user feedback data to modify the user profile data for the user.

* * * * *